United States Patent
Yamamuro et al.

(10) Patent No.: US 7,615,908 B2
(45) Date of Patent: Nov. 10, 2009

(54) VEHICLE ALTERNATOR WITH IMPROVED OPERATION RELIABILITY

(75) Inventors: Kazuhiko Yamamuro, Chiryu (JP); Shigenobu Nakamura, Anjo (JP); Hiroki Yoshimura, Oobu (JP)

(73) Assignee: Denso Corporation, Kariya (JP)

( * ) Notice: Subject to any disclaimer, the term of this patent is extended or adjusted under 35 U.S.C. 154(b) by 144 days.

(21) Appl. No.: 11/812,912

(22) Filed: Jun. 22, 2007

(65) Prior Publication Data

US 2008/0061652 A1    Mar. 13, 2008

(30) Foreign Application Priority Data

| Sep. 11, 2006 | (JP) | ............................. 2006-245416 |
| Mar. 14, 2007 | (JP) | ............................. 2007-065682 |
| Apr. 6, 2007  | (JP) | ............................. 2007-100083 |

(51) Int. Cl.
   *H02K 13/00*    (2006.01)

(52) U.S. Cl. ...................... 310/228; 310/239

(58) Field of Classification Search ......... 310/227–228, 310/239, 88
See application file for complete search history.

(56) References Cited

U.S. PATENT DOCUMENTS

| 5,296,772  | A  | * | 3/1994  | Bradfield et al. ............ 310/242 |
| 5,550,418  | A  | * | 8/1996  | Chung .......................... 310/239 |
| 6,294,856  | B1 |   | 9/2001  | Ishida et al. |
| 6,664,699  | B2 | * | 12/2003 | Shioya et al. ................ 310/239 |
| 6,710,499  | B2 | * | 3/2004  | Tsuge .......................... 310/232 |
| 2006/0273685 | A1 |  | 12/2006 | Wada et al. |

FOREIGN PATENT DOCUMENTS

| JP | A 2000-139058 | 5/2000 |
| JP | A 2002-359951 | 12/2002 |
| JP | A 2006-340467 | 12/2006 |

\* cited by examiner

*Primary Examiner*—Michael C Zarroli
(74) *Attorney, Agent, or Firm*—Oliff & Berridge, PLC

(57) ABSTRACT

An alternator for a vehicle is disclosed as having front and rear frames supporting a stator having a stator winding, a rotor fixedly carried on a rotary shaft and rotatably disposed inside the stator while having a field winding, a bush unit accommodating brushes held in sliding contact with slip rings formed on the rotary shaft, and a brush-wear particle collecting section for collecting brush-wear particles resulting from sliding contact between the brushes and the slip rings. In one embodiment, the bush unit includes a bush holder holding the bushes and a sealing plate member having the brush-wear particle collecting section. In another embodiment, the rear frame carries a protective cover formed with the brush-wear particle collecting section. In a further embodiment, the rotary shaft carries thereon brush-cooling means formed adjacent to the slip rings for creating an air stream to cool the brushes.

40 Claims, 13 Drawing Sheets

VEHICLE ALTERNATOR WITH IMPROVED OPERATION RELIABILITY

CROSS REFERENCE TO RELATED APPLICATIONS

This application is related to Japanese Patent Application Nos. 2006-245416, 2007-65682 and 2007-100083, filed on Sep. 11, 2006, Mar. 14, 2007 and Apr. 6, 2007, respectively, the contents of which are hereby incorporated by reference.

BACKGROUND OF THE INVENTION

1. Technical Field of the Invention

The present invention relates to vehicle alternators and, more particularly, to a vehicle alternator having a brush unit to supply excitation current to a field winding of a rotor.

2. Description of the Related Art

With vehicle alternators of the related art, it has been a general practice to have a brush unit through which excitation current is supplied to a field winding of a rotor. The brush unit generally includes a brush holder disposed above slip rings formed on a rotary shaft of the rotor, and brushes movably held in the brush holder in sliding contact with the slip rings. Entire circumferences of the brushes are covered with the brush holder and a sealing plate. Due to sliding contact with the brushes and the slip rings, there has been an issue of brush-wear particles scattering from the brushes and accumulating in an area inside the brush holder. With the brush-wear particles accumulated inside the brush holder, an issue arises with deterioration taking place in electric insulation between the associated slip rings or between the associated brushes.

To address such an issue, an attempt has been made to provide a brush unit having a brush holder formed with a brush-wear particle discharge port through which brush-wear particles are discharged to the outside of the brush holder in a manner as disclosed in, for instance, U.S. Pat. No. 6,294,856.

However, the provision of the brush-wear particle discharge port formed in the brush holder causes an increase in probability of water intruding the inside of the brush holder. Especially, if the brush holder is wholly submerged under water, an inevitable issue arises with water intruding the inside of the brush holder. When this takes place, muddy water or salt water adhere onto the brush holder, causing the brushes to be brought out of contact with the slip rings with resultant defective operation of generating electric power.

With the vehicle alternator of the related art, further, it has been a usual practice for electric component parts such as a voltage regulator and a rectifier or the like to be mounted on the vehicle alternator in a rear area thereof at a position remotest from a pulley coupled to the rotary shaft at a front end thereof. These electric component parts are covered with a rear cover configured in a structure to block the intrusion of foreign matters to the inside of the rear cover. In addition, another attempt has been made to employ a brush unit with a peripheral structure in which a brush holder has a large opening oriented downward as disclosed in, for instance, U.S. Pat. No. 6,710,499. Such a structure enables the brushes, held in sliding contact with the slip rings, to be cooled, while discharging the brush-wear particles caused by the movements of the brushes in sliding contact with the slip rings.

Meanwhile, with the vehicle alternator of the related art disclosed in such U.S. patent, air streams, flowing through areas around the brushes, are created only by the rotations of the slip rings formed in cylindrical configurations. Therefore, an air capacity decreases with a degraded effect of cooling the brushes. As the brushes increase in temperature in the absence of the adequate cooling effect, the brushes undergo abnormal wear. If the abnormal wear of the brushes occurs, the discharging of the brush-wear particles is inadequately performed. This causes a short-circuiting to occur between the slip rings with a resultant halt in operation to generate electric power. Thus, an effective countermeasure is needed to address such an issue.

SUMMARY OF THE INVENTION

The present invention has been completed with a view to addressing the above issues and has an object to provide a vehicle alternator that can favorably suppress the incursion of water to a brush holder and eliminate abnormal wears of brushes while preventing the occurrence of an undesirable conducting path, resulting from accumulated brush-wear particles, and the occurrence of defective operation to generate electric power.

To achieve the above object, a first aspect of the present invention provides an alternator for a vehicle, comprising a frame supporting a stator having a stator winding, a rotary shaft rotatably supported with the frame and having slip rings, a rotor fixedly carried on the rotary shaft to be rotatable inside the stator and having a field winding electrically connected to the slip rings, a brush unit fixed to the frame and having a brush holder, formed with brush accommodating portions for holding brushes in areas above the slip rings in sliding contact therewith, respectively, a slip ring accommodating section for covering outer peripheries of the slip rings in one part, springs for pressing the brushes toward the slip rings, respectively, and a sealing plate member coupled to the brush holder for covering the outer peripheries of the slip rings in another part, the brush unit having one end face formed with an opening portion, axially opening toward the frame and surrounding the rotary shaft, which is spaced from the frame with a clearance that is substantially sealed, and the other end face closed with the brush holder and the sealing plate member, and a brush-wear particle collecting member placed in close proximity to at least one of the slip rings in an area below the slip rings and associated with the brush holder for collecting brush-wear particles generated by the brushes in sliding contact with the slip rings, respectively.

With the vehicle alternator of such a structure, the brush unit is capable of nearly sealing the slip rings with the sealing plate member, the frame and the brush holder. In addition, the brush-wear particle collecting member is placed in close proximity to at least one of the slip rings in an area below the slip rings and associated with the brush holder for collecting brush-wear particles generated by the brushes in sliding contact with the slip rings, respectively. With such a structure, no need arises for the brush unit to have a clearance or port for the resulting brush-wear particles to be discharged to the outside. This blocks water from intruding the inside of the brush unit through the clearance or port, thereby preventing water from causing the wears of the brushes on early stages or preventing the occurrence of other electrical or electrochemical adverse affects.

With the alternator of the present embodiment, the brush-wear particle collecting member may preferably include a brush-wear particle collecting section, formed on the sealing plate member in the area below the slip rings, which has a narrowed wear-particle drop-off passage through which the brush-wear particles are guided to the brush-wear particle collecting section.

With such a structure, since the brush-wear particle collecting member includes the brush-wear particle collecting section, formed on the sealing plate member, no need arises for the brush unit to employ additional component part. With the sealing plate member formed with the brush-wear particle collecting section, the brush unit can be structured with a minimum number of component parts with a resultant reduction in production cost. In addition, the brush-wear particle collecting section, formed on the sealing plate member in the area below the slip rings, can collect the brush-wear particles under a sealed state with no water-incursion to the inside of the brush unit. This avoids the occurrence of brush-wear particles accumulating on the slip rings or in areas around the brushes, reliably eliminating the occurrence of degradation in electrical insulation between the brushes and between the slip rings.

With the alternator of the present embodiment, the sealing plate member may preferably include a partition wall laterally extending along an axial direction of the rotary shaft in an area between the outer peripheries of the slip rings and the brush-wear particle collecting section, and the partition wall having a distal end defining a narrowed wear-particle drop-off passage with respect to an inner wall of the sealing plate member.

With such a structure, the narrowed wear-particle drop-off passage can be formed in the sealing plate member with a reduction in material cost and in a simplified structure.

With the alternator of the present embodiment, the partition wall may be preferably made of resin to be integrally formed with the sealing plate member.

With such a structure, the partition wall is made of resin to be integrally formed with the sealing plate member, thereby preventing the occurrence of an increase in the number of manufacturing steps.

With the alternator of the present embodiment, the partition wall may preferably and laterally extend from an inner wall of the sealing plate member in a direction opposite to a direction in which the slip rings rotate.

With such a structure, the partition wall can effectively prevent the brush-wear particles from re-scattering from the brush-wear particle collecting section without providing a barrier to the brush-wear particles dropping into the brush-wear particle collecting section.

With the alternator of the present embodiment, the brush-wear particle collecting member may preferably have one region beneath the partition wall and the other region beneath the wear-particle drop-off passage, with the one region having a greater capacity than that of the other region.

With such a structure, no need arises for replacement of the brush unit for an expected lifetime of the vehicle (supposed entire mileage).

With the alternator of the present embodiment, the sealing plate member may preferably include first and second sloped partition walls laterally extending downward toward the narrowed wear-particle passage from inner walls of the sealing plate member along an axial direction of the rotary shaft in areas between the outer peripheries of the slip rings and the brush-wear particle collecting section, and the first and second partition walls having distal ends defining therebetween the narrowed wear-particle drop-off passage.

With such a structure, the sealing plate member is formed with the first and second partition walls extending downward toward the wear-particle passage so as to narrow a width of the same. This allow the narrowed wear-particle passage to be formed in the area below the slip rings, enabling the brush-wear particles from dropping into the brush-wear particle collecting section in a highly reliable manner.

With the alternator of such a structure, further, upper surfaces of the first and second partition walls may preferably have respective slopes inclined downward toward the respective distal ends. With such an arrangement, the brush-wear particles, dropped off to the first and second partition walls, are guided to the brush-wear particle drop-off passage due to vibration of the vehicle alternator and own weights of the particles and, in addition thereto, a swirling flow of air stream accompanied by the rotation of the rotary shaft.

With the alternator of the present embodiment, the sealing plate member may further preferably include a third partition wall, placed between a clearance between the first and second partition walls and the slip rings, which axially extends from an inner wall, placed in opposition to the frame, of the sealing plate member toward the frame at a height different from those of the first and second partition walls so as to vertically overlap the first and second partition walls in a spaced relationship thereto.

With the sealing plate member of such a structure, the first to third partition members provide a kind of a labyrinth seal structure. This results in a capability of effectively preventing the brush-wear particles, accumulated in the brush-wear particle collecting section, from re-scattering to the areas around the slip rings.

With the alternator of the present embodiment, the sealing plate member may preferably have first and second sloped partition walls laterally extending downward at different heights toward the narrowed wear-particle passage from inner walls of the sealing plate member along an axial direction of the rotary shaft in intervening areas between the outer peripheries of the slip rings and the brush-wear particle collecting member, and the first and second partition walls having distal ends vertically overlapping each other through a clearance defining the narrowed wear-particle drop-off passage.

With the sealing plate member of such a structure, the first and second partition members provide a kind of a labyrinth seal structure. This results in a capability of effectively preventing the brush-wear particles, accumulated in the brush-wear particle collecting section, from re-scattering to the areas around the slip rings.

With the alternator of the present embodiment, the partition wall may preferably have a distal end formed with a downwardly extending protrusion forming the narrowed wear-particle drop-off passage.

With such a structure, the downwardly extending protrusion can prevent the brush-wear particles, accumulated in the brush-wear particle collecting section, from re-scattering to the upper areas around the slip rings through the narrowed wear-particle drop-off passage.

With the alternator of the present embodiment, the partition wall may preferably and continuously slope downward toward a distal end thereof.

With the partition wall formed in such a configuration, the brush-wear particles, dropped off to the first and second partition walls, are guided to the brush-wear particle drop-off passage due to vibration of the vehicle alternator and a swirling flow of air stream accompanied by the rotation of the rotary shaft, after which the brush-wear particles drop off to the brush-wear particle collecting section.

With the alternator of the present embodiment, the sealing plate member may preferably have first and second sidewalls fitted to the brush holder, and wherein the partition wall laterally extends from the first sidewall, and the sealing plate member has a slanted wear-particle slipping slope obliquely extending downward from the second sidewall in an area below the narrowed wear-particle drop-off passage.

With such a structure, the slanted wear-particle slipping slope obliquely is inclined downward from the second sidewall of the sealing plate member toward an area in a position below an axial center of the rotary shaft. This enables the brush-wear particles, dropped off to the slanted wear-particle slipping slope, to slide on the slanted wear-particle slipping slope to an area remote from the brush-wear drop-off passage in a reliable manner.

With the alternator of the present embodiment, the brush-wear particle collecting member may preferably have a capacity available to accumulate a total amount of brush-wear particles supposed to appear during a given usable life of the vehicle.

Another aspect of the present invention provides an alternator for a vehicle, comprising front and rear frames supporting a stator having a stator winding, a rotary shaft rotatably supported with the front and rear frames and having one end portion formed with slip rings, a rotor fixedly carried on the rotary shaft to be rotatable inside the stator and having a field winding electrically connected to the slip rings, a brush unit having a brush holder, formed with brush accommodating portions for holding brushes in sliding contact with the slip rings, respectively, a slip ring accommodating section for covering outer peripheries of the slip rings in one part, springs for pressing the brushes toward the slip rings, respectively, and a sealing plate member coupled to the brush holder for covering the outer peripheries of the slip rings in another part. The brush unit has a front end face, surrounding the slip rings and formed with an opening portion opened to the rear frame, a sealing element substantially sealing a clearance between the rear frame and the front end face of the brush unit, and a rear end face that is closed with at least one of the brush holder and the sealing plate member. The sealing plate member includes a brush-wear particle collecting section placed in close proximity to the slip rings in an area below the slip rings and having a wear-particle drop-off passage for collecting brush-wear particles generated from the brushes in sliding contact with the slip rings, respectively, and a narrowed section for narrowing the wear-particle drop-off passage along an axial direction of the rotary shaft.

With the vehicle alternator of such a structure, the brush unit is capable of nearly sealing the slip rings with the sealing plate member, the rear frame and the brush holder. Further, the brush-wear particle collecting section is placed in close proximity to the slip rings in an area below the slip rings and having a wear-particle drop-off passage for collecting brush-wear particles generated from the brushes in sliding contact with the slip rings, respectively. With such a structure, no need arises for the brush unit to have a clearance or port for the resulting brush-wear particles to be discharged to the outside. Thus, water-incursion to the inside of the brush unit through the clearance or port can be prevented. This prevents water from causing the wears of the brushes on early stages or preventing the occurrence of other electrical or electrochemical adverse affects.

Another aspect of the present invention provides an alternator for a vehicle, comprising a frame supporting a stator having a stator winding, a rotary shaft rotatably supported with the frame and having slip rings, a rotor fixedly carried on the rotary shaft to be rotatable inside the stator and having a field winding electrically connected to the slip rings, brushes held in sliding contact with outer peripheries of the slip rings, respectively, a cover member covering a surrounding space around the outer peripheries of the slip rings and the brushes, a protector cover fixedly secured to the frame for covering an electric component, involving the brushes, and including a brush-wear particle collecting section for collecting brush-wear particles resulting from sliding contact between the brushes and the slip rings, and a sealing member disposed between the cover member and the protector cover for ensuring airtightness of the surrounding space.

With the alternator of such a structure, with the sealing member disposed between the cover member and the protector cover, the surrounding space around the brushes and the slip rings can have increased waterproof (airtightness) to block the entry of water to the surrounding space from the outside. In addition, with the surrounding space around the brushes and the slip rings ensuring increased airtightness, the brush-wear particles become hard to be expelled to the outside of the alternator. However, since the protector cover includes the brush-wear particle collecting section, the brush-wear particles can be collected in the brush-wear particle collecting section. Thus, the brush-wear particle collecting section, provided on the protector cover, blocks the brush-wear particles from scattering to and adhering onto the sliding surfaces between the slip rings and the brushes. This results in a capability of preventing the occurrence of abnormal wears of the brushes while eliminating the occurrence of short-circuiting between the adjacent slip rings, thereby avoiding the alternator from malfunctioning in generating electric power.

With the alternator of the present embodiment, the brush-wear particle collecting section may be preferably formed in communication with the surrounding space and has at least one portion located in an area closer to the ground than the slip rings under a state where the alternator is assembled to the vehicle.

With the alternator of the present embodiment, especially, at least one portion of the brush-wear particle collecting section may preferably have a capacity available to collect a total amount of brush-wear particles generated for a period of time in which the brushes are used for related application limits.

This makes it possible to reliably collect the brush-wear particles resulting from the operation of the alternator in generating electric power.

With the alternator of the present embodiment, the brush-wear particle collecting section may be preferably supported on the protector cover to be rotatable about a center of axis of the rotary shaft.

Such a structure enables the brush-wear particle collecting section to be set to an adjustable angular position even after the alternator assembled to the vehicle at a differing position. Thus no need arises for the protector cover with the brush-wear particle collecting section oriented in a different position to be prepared for each assembling state. This avoids an increase in the number of component parts, enabling the suppression of an increase in production cost.

Another aspect of the present invention provides an alternator for a vehicle, comprising a frame supporting a stator having a stator winding, a rotary shaft rotatably supported with the front and rear frames and having a pair of slip rings, a rotor fixedly carried on the rotary shaft to be rotatable inside the stator and having a field winding electrically connected to the slip rings, a pair of brushes held in sliding contact with outer peripheries of the slip rings, respectively, a cover member covering a surrounding space around the brushes and the outer peripheries of the slip rings, and a brush-cooling member carried on the rotary shaft in an area adjacent to the slip rings for causing an air stream to flow in the surrounding space to cool the brushes in sliding contact with the slip rings.

With the alternator of such a structure, with the rotary shaft carrying the brush-cooling member in the area adjacent to the slip rings, the rotation of the rotary shaft accompanies with the rotation of the brush-cooling member in an area close proximity to the slip rings. When this takes place, the brush-cooling member causes an air stream to efficiently occur from ambient air prevailing in a surrounding area around the rotary shaft. This increases a flow of an air capacity in surrounding areas around the slip ring. This prevents temperature rises of the brushes due to shortage of cooling capacities, making it possible to avoid the brushes from abnormal wears and the slip rings form short-circuiting for thereby preventing the alternator from malfunctioning in generating electric power.

With the alternator of the present embodiment, the brush-cooling member may preferably include a plurality of insulating protrusions formed between the slip rings at equidistantly spaced intervals in a circumferential direction of the rotary shaft.

With the alternator of the present embodiment, at least one of the protrusions may preferably incorporate therein at least a portion of a wiring member providing electrical connection between the field winding and one of the slip rings remotest from the field winding. The use of an inside of one of the protrusion provides an increase in freedom in design layout of the wiring member.

With the alternator of the present embodiment, the cover member may preferably have an opening portion opening at an area below the slip rings under a state where the alternator is assembled to the vehicle.

Such a structure provides an ease of drawing an air stream at an increased flow rate from an outside of the brush unit to an area close proximity to the sliding surfaces between the slip rings and the brushes and the brush-cooling member. In addition, the presence of air stream flowing at an increased rate enables the brush-wear particles, occurring on the sliding surfaces of the slip rings, to be efficiently discharged at an increased rate.

With the alternator of the present embodiment may preferably further comprise a partition wall disposed between the opening portion and the slip rings.

Such a structure enables an air stream to flow from an upstream to a downstream in a direction toward an airspace defined between the slip rings and the partition wall along a rotational direction of the brush-cooling member. This enables the brushes and the slip rings to be effectively cooled while efficiently discharging the brush-wear particles.

With the alternator of the present embodiment, the partition wall may preferably have an inner periphery concentric to the slip rings. Especially, an upstream side of the partition wall may preferably have an air-intake opening defined between the partition wall and the cover member and a downstream side of the partition wall has an exhaust opening defined between the partition wall and the cover member, and the air-intake opening and the exhaust opening have the same cross sectional surface area.

DETAILED DESCRIPTION OF PREFERRED EMBODIMENTS

Figure 1:
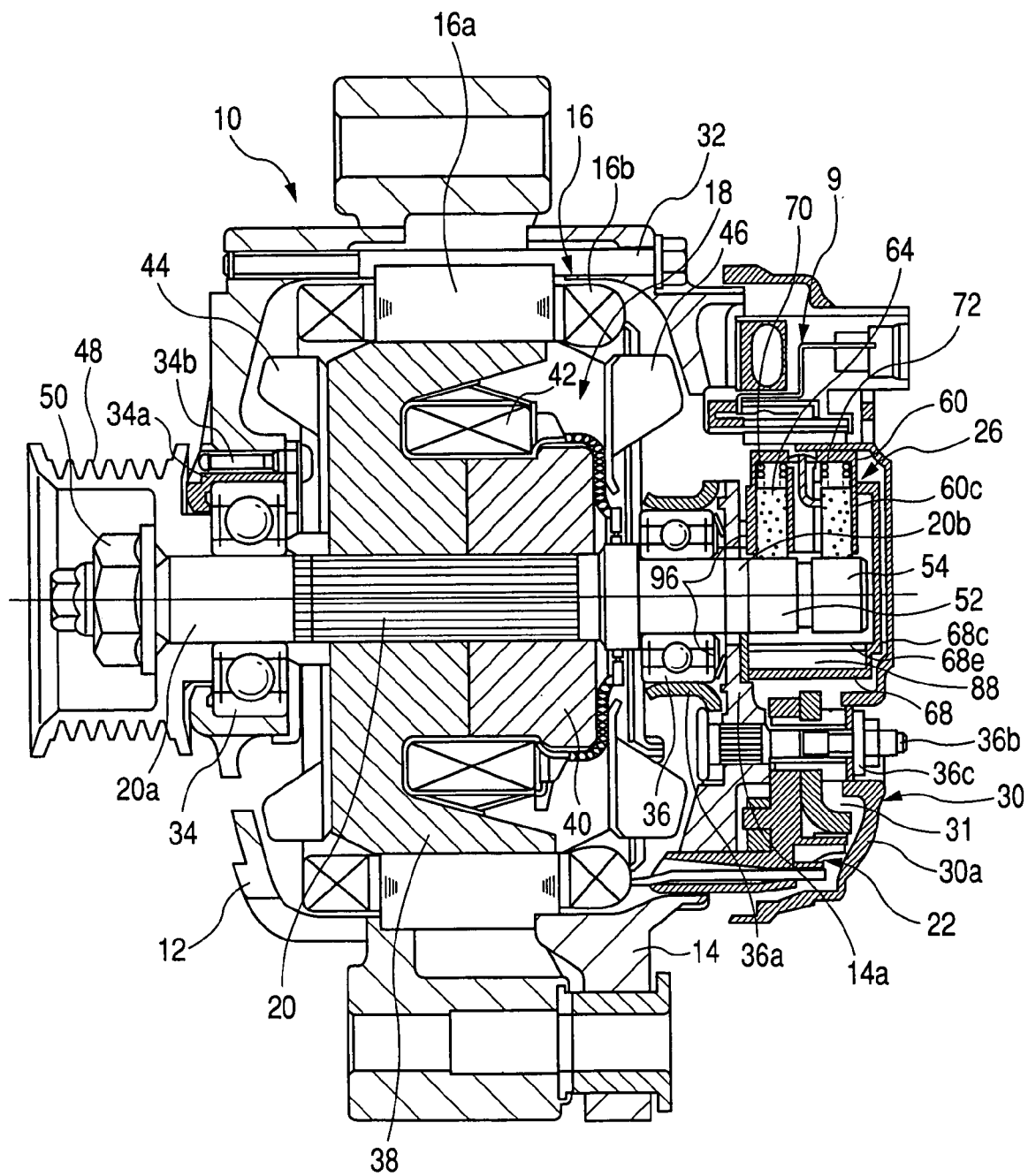
FIG. 1 is a cross sectional view showing an overall structure of a vehicle alternator of a first embodiment according to the present invention.

Now, vehicle alternators of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding component parts throughout the several views. Also in the following description, it is to be understood that such terms as "front", "rear", "upward", "downward", "rightward", "leftward" and the like, are words of convenience and are not to be construed as limiting terms.

First Embodiment

[Overall Structure]

A vehicle alternator of a first embodiment according to the present invention will be described below in detail with reference to FIG. 1 of the accompanying drawings.

FIG. 1 is a longitudinal cross sectional view showing an overall structure of the vehicle alternator of the first embodiment implementing the present invention. As shown in FIG. 1, the vehicle alternator 10 includes a front frame 12, a rear frame 14, a stator 16 supported with the front and rear frames 12, 14, a Lundell-type rotor 18 carried on a rotary shaft 20 to be rotatable inside the stator 16, a rectifier 22, a voltage regulator 24, a brush unit 26, and a protector cover 30 fixedly secured to the rear frame 14 so as to define an electric parts compartment 31 accommodating an electric device including the rectifier 22, the voltage regulator 24 and the brush unit 26 all of which are fixedly mounted on the rear frame 14.

Both the front and rear frames 12, 14 take bowl-shapes in cross section with openings placed in face-to-face relation to each other, under which the front and rear frames 12, 14 are tightened to each other by means of a plurality of through-bolts 32 with the stator 16 being sandwiched in an axial direction. The front and rear frames 12, 14 carry thereon front and rear bearings 34, 36, which rotatably support the rotary shaft 20 to allow the Lundell-type rotor 18 to be rotatable within an inner periphery of the stator 16. The front and rear bearings 34, 36 are fixedly supported by means of bearing boxes 34a, 36a, which are supported on the front and rear frames 12, 14 by pluralities of fixture bolts 34b, 36b, respectively. The protector cover 30 is fixed to the rear frame 14 by nuts 36c screwed onto the bolts 36b.

The stator 16 includes a stator core 16a, fixedly supported with the front and rear frames 12, 14, and a stator winding 16b carried by the stator core 16a and composed of, for instance, a three phase winding to generate, for instance, a three-phase AC voltage. The rotor 18 includes front and rear pole cores 38, 40, carrying thereon a field winding 42, which are fixedly supported on the rotary shaft 20. The pole cores 38, 40 have axial end faces carrying thereon front and rear centrifugal type cooling fans 44, 46, respectively. The centrifugal type front cooling fan 44 includes a mixed flow fan that has a plurality of fan blades tilted forward with respect to a rotational direction of the rotor 18 for the purpose of flowing a cooling wind toward the field winding 42.

In addition, the rotary shaft 20 has a front-end 20a, on which a pulley 48 is fixedly mounted by means of a nut 50, to be rotatably driven with output torque of an engine (not shown) of a vehicle. Moreover, the rotary shaft 20 has a rear end portion 20b extending through the rear frame 14 to an area outside thereof and formed with a pair of slip rings 52, 54 at given axially spaced positions. The slip rings 52, 54 are electrically connected to both ends of the field winding 42, respectively.

The voltage regulator 24 serves to regulate an excitation current to be supplied to the field winding 42 through the slip rings 52, 54. Meanwhile, the Lundell-type rotor 18 is driven to cause the stator winding 16b of the stator 16 to generate a three-phase AC voltage. The rectifier 22 executes full rectification on the three-phase AC voltage, generated by the stator winding 16b, for conversion to a DC output voltage. The vehicle alternator 10 of the present embodiment has the same structure in other respect to that of a usual vehicle alternator and operates in the same manner as that usual vehicle alternator. Therefore, the vehicle alternator 10 of the present invention will be described below further in detail with a focus on unique features of the present invention.

(Brush Device 26)

Hereunder, the brush unit 26, giving unique features of the present embodiment, is described in detail with reference to FIG. 1.

The brush unit 26 includes a brush holder 60 having connection terminals 62, a pair of brushes 64, 66 operatively supported in the brush holder 60 above the slip rings 52, 54 at axially spaced positions in sliding contact with the slip rings 52, 54, respectively, and a sealing plate member 68 for sealing a lower part of the brush holder 60 while covering outer peripheries of the slip rings 52, 54. The brushes 64, 66 are discretely connected to a pair of output terminals of the voltage regulator 24. The brush holder 60 also accommodates therein springs 70, 72 for pressing the brushes 64, 66 toward the slip rings 52, 54 (see FIG. 4).

(Overall Structures of Brush Holder 60 and Sealing Plate Member 68)

Overall structures of the brush holder 60 and the sealing plate member 68, both made of resin, will be described below in detail with reference to FIGS. 2 to 4.

Figure 2:
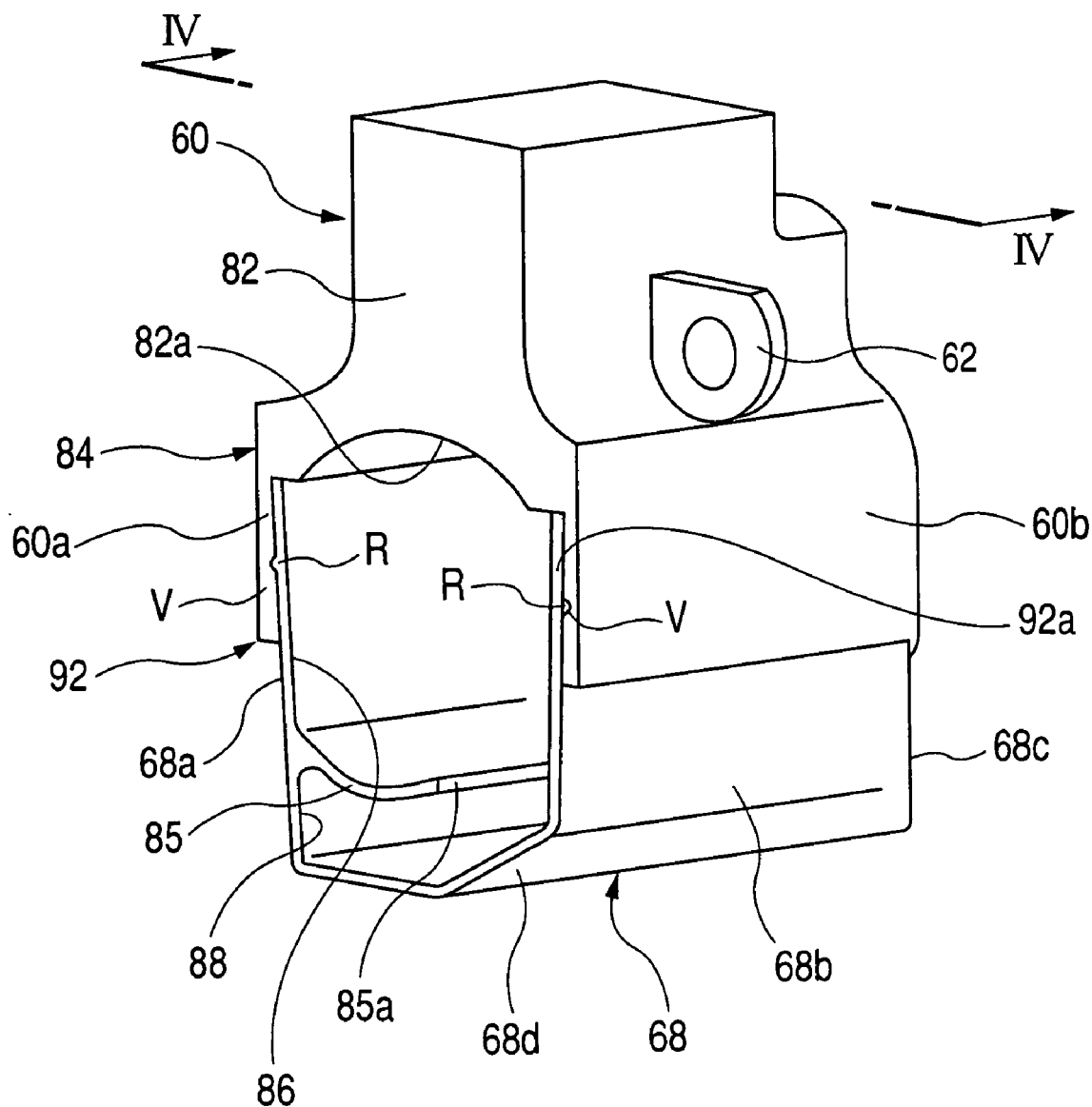
FIG. 2 is a perspective view of a unitized brush unit forming part of the vehicle alternator of the present embodiment shown in FIG. 1.

FIG. 2 is a perspective view showing the brush holder 60 and the sealing plate member 68 that are unitized with each other in an assembled state. FIG. 3 is an exploded perspective view showing the brush holder 60 and the sealing plate member 68. FIG. 4 is a cross sectional view of the brush holder 60 and the sealing plate member 68 taken on a plane parallel to a radial direction. However, while the brush holder 60 and the sealing plate member 68 are exemplarily shown in upright states in FIGS. 2 to 4 on a vertical plane, these component parts may be slightly dislocated from such upright states. In addition, it will be appreciated that the brush holder 60 has the same shape as that of the brush holder of the related art except for the sealing plate member 68 constituting a unique feature of the present embodiment.

The brush holder 60, having a substantially box-like shape in cross section, includes a substantially rectangular brush accommodating section 82, formed on the brush holder 60 in an upper area thereof and having a bottom end formed with an opening 82a oriented downward, and a slip ring receiving section 84 extending downward from the brush accommodating section 82 for receiving substantially upper half areas of the rear end portion 20b of the rotary shaft 20 and the slip rings 52, 54.

The slip ring receiving section 84 of the brush body 60 includes a pair of vertically extending bifurcated sidewall portions 84a, 84b, vertically extending downward from the brush accommodating section 82 at lateral edges thereof on both sides of the opening 82a thereof at left and right areas of the slip rings 52, 54, and a rear end wall 84c integrally formed with a rear end wall of the holder body 80 so as to vertically extend downward therefrom at a position with a given distance from a rear end face of the rotary shaft 20. In addition, the slip ring receiving section 84 has an opening portion 84d formed at a front end wall and a bottom end wall of the slip ring receiving section 84 so as to accommodate the rear end portion 20b of the rotary shaft 20.

With such a structure of the brush holder 60 formed with the slip ring receiving section 84, the sidewall portions 84a, 84b have inner walls formed with V-shaped recesses "V" laterally extending in parallel to the axis of the rotary shaft 20 for a reason described below.

Meanwhile, the sealing plate member 68 includes a pair of sidewall portions 68a, 68b, which vertically and axially extend on both sides of the slip rings 52, 54 of the rotary shaft 20 at laterally spaced positions. A rear end wall portion 68c is integrally formed with rear end faces of the sidewall portions 84a, 84b so as to vertically extend in an area spaced from the distal end of the rotary shaft 20 by a given distance. A bottom plate section 68d is integrally formed with the sidewall portions 68a, 68b and the rear end wall portion 68c at bottom ends thereof so as to laterally extend in a direction along the axis of the rotary shaft 20. A partition wall 85 laterally extends from the sidewall portion 68a of the sealing plate member 68 at a lower portion thereof toward the sidewall portion 68b. The partition wall 85 has a lateral end 85a laterally spaced from the sidewall portion 68b to form a wear-particle drop-off passage 87.

The partition wall 85 serves to partition an inner space of the sealing plate member 68 into an upper slip ring encompassing compartment 86 and a wear-particle collecting compartment 88. The slip ring encompassing compartment 86 is opened upward to face the opening 82a of the brush accommodating section 82 in communication therewith to form a slip ring accommodating compartment 90 as a whole as shown in FIGS. 2 and 3. In addition, the wear-particle collecting compartment 88 has a front end formed with an opening portion 88a for permitting a removal of the sealing plate member 68 from a molding die (not shown).

In design of the sealing plate member 68, the sidewall portions 68a, 68b and the rear end wall portion 68c of the sealing plate member 68 are dimensioned in size to be appropriately fitted to insides of the sidewall portions 84a, 84b and the rear end wall portion 84c of the slip ring receiving section 84 forming part of the brush holder 60 in coupling engagement with the sidewall portions 84a, 84b and the rear end wall portion 84c of the slip ring receiving section 84.

Figure 3:
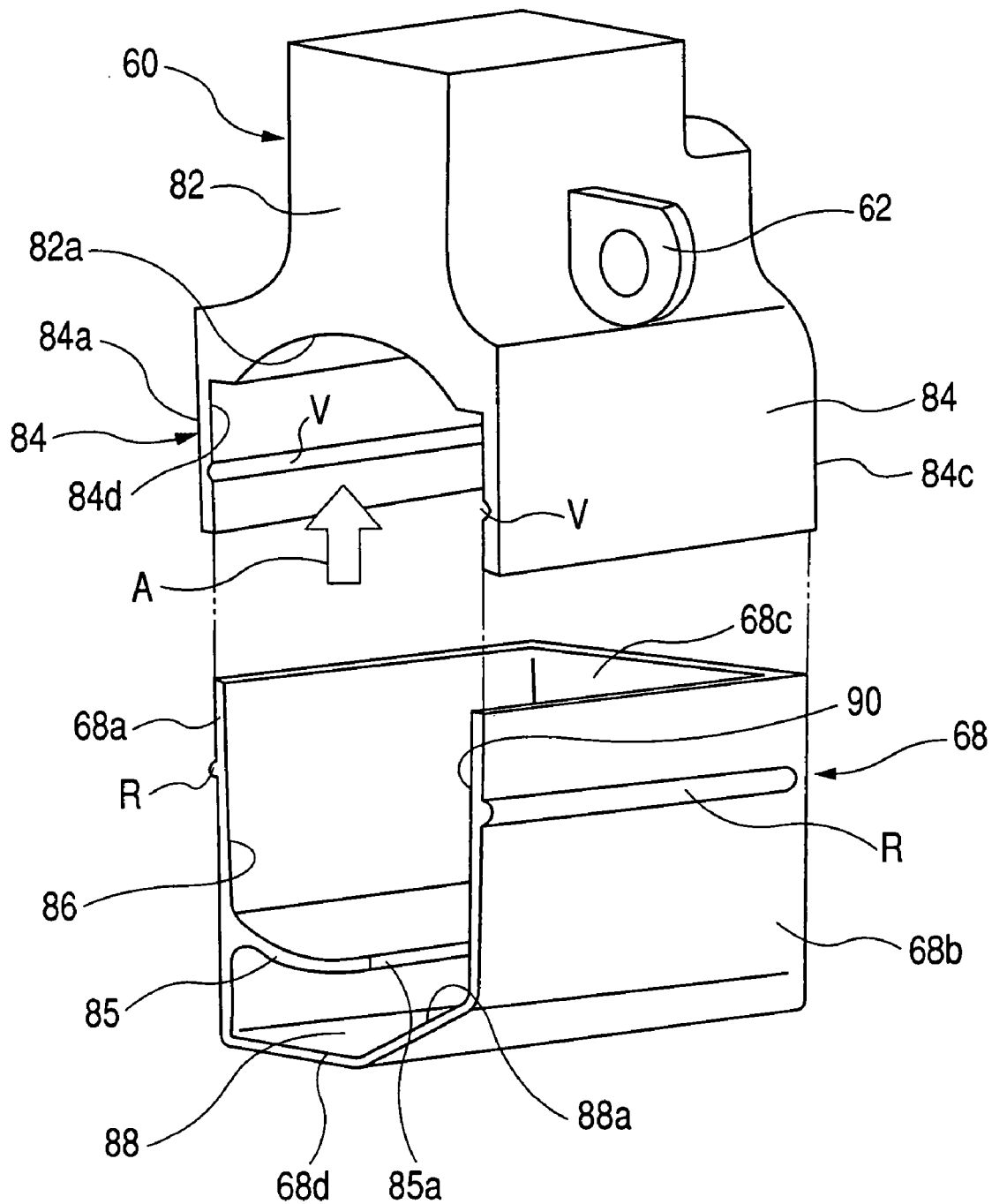
FIG. 3 is an exploded perspective view showing the brush unit shown in FIG. 2.

As shown in FIG. 3, the sealing plate member 68 is forcibly inserted to the inside of the brush holder 60 in an upper direction, as shown by an arrow "A" representing a direction for the sealing plate member 68 to be assembled to the brush holder 60, allowing the sealing plate member 68 to be assembled to the brush holder 60 in a unitary structure. Thus, the slip ring receiving section 84 of the brush holder 60 and the slip ring encompassing compartment 86 of the sealing plate member 68 define a unitized slip ring accommodating section 92 having an opening portion 92a as shown in FIG. 2.

The sidewall portions 68a, 68b of the sealing plate member 68 have outer surfaces formed with axially extending ribs "R", respectively, in axial alignment with the recesses "V" formed on the inner surfaces of the sidewall portions 84a, 84b of the brush holder 60. Upon coupling engagement between the ribs "R" formed on the sidewall portions 68a, 68b of the sealing plate member 68 and the recesses "V" formed in the sidewall portions 84a, 84b of the brush holder 60, a drop-off of the sealing plate member 68 from the brush holder 60 is avoided.

The opening portion 92a, formed on the unitized slip ring accommodating section 92 at a front end thereof, and the opening portion 88a, formed on the wear-particle collecting compartment 88 at a front end thereof, are closed with a vertically extending closure plate 96, made of resin, as shown in FIG. 1. Under such a state, the brush holder 60 is pressed against and tightly connected to an end wall 14a of the rear frame 14 via the closure plate 96 as shown in FIG. 1. Thus, the closure plate 96 completely closes the opening portion 88a formed at the front area of the wear-particle collecting compartment 88. In addition, the opening portion 92a, formed on the unitized slip ring accommodating section 92 at the front end thereof, slightly communicates with an inside of the rear frame 14 only through a clearance created in an area around the rear end portion 20b of the rotary shaft 20. The closure plate 96 may be preferably made of a resilient member such as a rubber plate to provide a waterproof effect utilizing a force for the brush holder 60 to be coupled to the rear frame 14.

(Wear-Particle Collecting Compartment 88 and Partition Wall 85)

The wear-particle collecting compartment 88 and the partition wall 85 of the sealing plate member 68 have various unique shapes, which will be described below with reference to FIG. 4 that is a cross sectional view taken on line IV-IV of FIG. 2.

Figure 4:
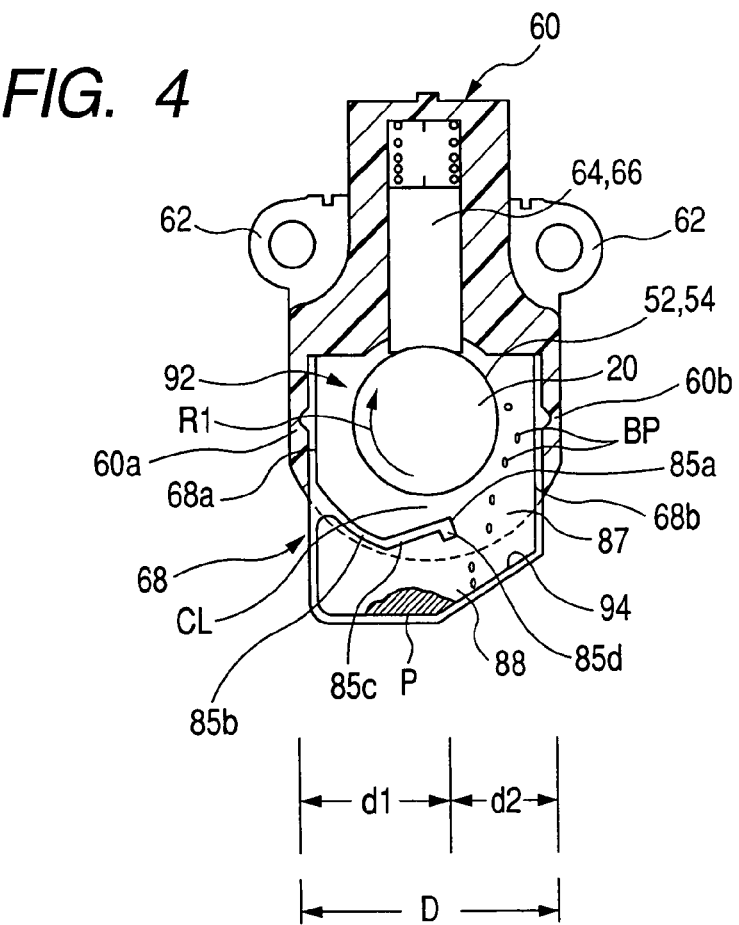
FIG. 4 is a cross sectional view showing a brush holder and a sealing plate member forming parts of the brush unit shown in FIG. 3 as viewed in a radial direction.

As shown in FIG. 4, first, the partition wall 85 has a slightly inclined down-slope portion 85b, laterally protruding from the sidewall portion 68a of the sealing plate member 68 toward the sidewall portion 68b thereof along a substantially circumferentially direction of the rotary shaft 20, and an up-slope portion 85c integral with the down-slope portion 85b and laterally extending upward therefrom in a shape to be closer to the outer periphery of the rotary shaft 20. The up-slope portion 85c is ended at the lateral end 85a of the partition wall 85. This enables a reduction in a clearance CL between the up-slope 85c of the partition wall 85 and the outer peripheries of the slip rings 52, 54. Therefore, the up-slope 85c of the partition wall 85 can effectively prevent brush-wear particles from entering such a clearance CL and accumulating on an upper surface of the partition wall 85.

Secondly, the partition wall 85 and the bottom plate section 68d of the sealing plate member 68 have inner surfaces formed with the wear-particle collecting section 88. In addition, the wear-particle drop-off passage 87 is defined between the lateral end 85a of the partition wall 85 and the inner surface of the sidewall portion 68b of the sealing plate member 68 in an upper area above the wear-particle collecting section 88. Thus, with the rotary shaft 20 rotating in a direction as shown by an arrow R1 in FIG. 4, brush-wear particles BP are created from the brushes 64, 66. The wear-particle drop-off passage 87 allows the brush-wear particles BP, passing through the unitized slip ring accommodating section 92, to drop into the wear-particle collecting section 88 for accumulating brush-wear particles BP thereon into a layer P of sediments. The wear-particle drop-off passage 87 has a narrowed cross sectional area with the lateral end 85a of the partition wall 85, providing a capability of preventing the brush-wear particles from scattering to an area above the partition wall 85.

The brushes 64, 66 have lower ends held in sliding contact with the slip rings 52, 54, respectively. Thus, during operation of the vehicle alternator 10, the lower ends of the brushes 64, 66 create the brush-wear particles BP. Due to the rotation of the rotary shaft 20 in the direction shown by the arrow R1 in FIG. 4, the brush-wear particles BP move relative to the lower ends of the brushes 64, 66 as reference points to pass in a path along the outer peripheries of the slip rings 52, 54 in a rotational direction of the rotary shaft 20 to a downstream area thereof, dropping through the wear-particle drop-off passage 87 onto the wear-particle collecting section 88 of the sealing plate member 68.

The wear-particle drop-off passage 87 is formed in an area deviated to a downstream side of the rotational direction of the rotary shaft 20 with respect to the brushes 64, 66 as the reference points. In other words, the sealing plate member 68 has the partition wall 85, formed in the area below the slip rings 52, 54, which includes the up-slope portion 85c integral with the down-slop portion 85b protruding from the sidewall portion 68a and extending along the outer peripheries of the slip rings 52, 54 at an area below the same in an orientation opposite to the rotational direction of the rotary shaft 20.

This enables the sealing plate member 68 to be formed with the wear-particle drop-off passage 87 only in a local area through which the brush-wear particles BP actually drop. Thus, the sealing plate member 68 can permit the brush-wear particles BP to drop into the wear-particle collecting section 88 in a favorable fashion. Moreover, the wear-particle collecting section 88 has an upper area covered with the partition wall 85 excepting the wear-particle drop-off passage 87 formed in the localized area through which the brush-wear particles BP drop. This enables the brush-wear particles BP to be prevented from scattering from the wear-particle collecting section 88.

Thirdly, the partition wall 85 has the lateral end 85a formed with a protruding portion 85d that protrudes downward from an edge of the lateral end 85a of the up-slope 85c. With the partition wall 85 formed in such a structure, the protruding portion 85d reliably prevents the brush-wear particles, accumulated in the wear-particle collecting section 88, from scattering to the slip ring receiving section 84 of the brush holder 60 via the wear-particle drop-off passage 87.

Fourth, the sidewall portion 68b of the sealing plate member 68, placed in face-to-face relation to the lateral end 85a of the partition wall 85 via the wear-particle drop-off passage 87, includes a wear-particle slipping slope 94 that obliquely extends downward from the sidewall portion 68b. With the provision of such a wear-particle slipping slope 94, the brush-wear particles are caused to drop off to the wear-particle slipping slope 94 and guided along a surface of the wear-particle slipping slope 94 to an area remote from the wear-particle drop-off passage 87 in a favorable manner. This makes it hard for the brush-wear particles P, accumulated in the wear-particle collecting section 88, from scattering to an upper area through the wear-particle drop-off passage 87.

Fifth, the wear-particle collecting section 88 has a capacity available to accumulate a total amount of brush-wear particles produced in a durable term of a vehicle (such as, for instance, 10 years or a total mileage corresponding to such a durable term). With such a capacity of the wear-particle collecting section 88, the brush-wear particles can be shut tight.

Sixth, the wear-particle collecting section 88 has a lateral width D, of which a lateral width d1, covered with the partition wall 85, is selected to be greater than a lateral width d2 in an uncovered area. Thus, the wear-particle collecting section 88 has the covered area, defined in a region directly below the partition wall 8, and the uncovered area, defined in a region directly below the wear-particle drop-off passage 87, with the covered area having a larger lateral width than that of the uncovered area. This results in a capability of blocking the brush-wear particles P from re-scattering while increasing the maximum accumulation amount of the brush-wear particles. In addition, the partition wall 85 can have a greater axial length than that of the wear-particle drop-off passage 87. However, the wear-particle drop-off passage 87 may preferably set to have the axial length greater than that of the slip rings 52, 54. This allows the sealing plate member to have the same advantages as those mentioned above.

(First Modified Form)

A vehicle alternator of a first modified form of the first embodiment according to the present invention is described below with reference to FIG. 5. The same component parts as those of the vehicle alternator of the first embodiment bear like reference numerals.

With the vehicle alternator of the present modification, the sealing plate member of the brush unit 60 is modified in structure in contrast to the shape of the sealing plate member 68 of the brush unit 60 of the first embodiment shown in FIGS. 1 to 4.

More particularly, with the present modification, a sealing plate member 68A includes first and second bifurcated tapered partition walls 85A obliquely extending downward from the sidewall portions 68a, 68b to form a wear-particle drop-off passage 87A in an area directly below the axis of the slip rings 52, 54.

At least upper surfaces of the first and second partition walls 85A have slopes that extend downward toward distal ends of the respective partition walls. With the sealing plate member 68A with such a structure, the brush-wear particles, coming from the brushes 64, 66 in sliding contact with the slip rings 52, 54, dropped onto the first and second partition walls 85A, are guided to the wear-particle drop-off passage 87A due to vibration of the vehicle alternator during operation of the engine. In addition, the partition walls 85A are formed in symmetry with respect to a central axis of the rotary shaft 20. This allows the brush-wear particles to be reliably guided to the wear-particle collecting section 88 regardless of the rotational direction of the rotary shaft 20.

(Second Modified Form)

A vehicle alternator of a second modified form of the first embodiment is described below with reference to FIG. 6. The same component parts as those of the vehicle alternators of the first embodiment and the first modification bear like reference numerals.

Figure 5:
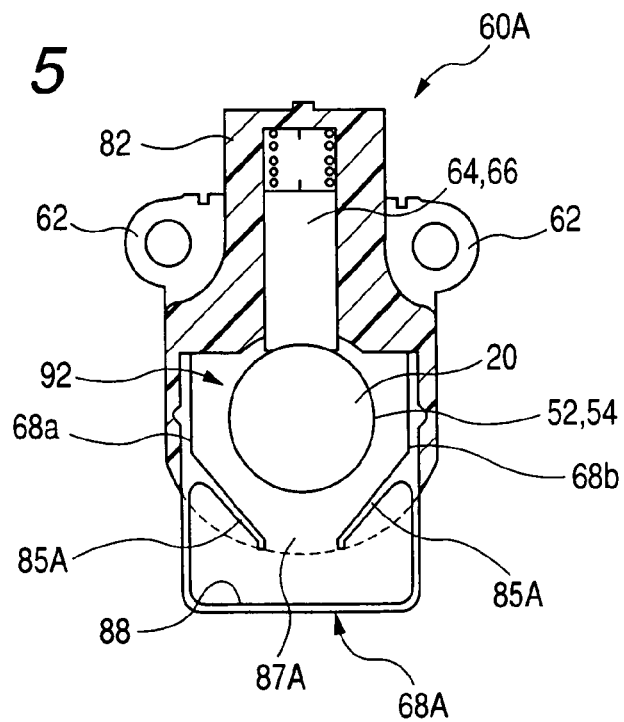
FIG. 5 is a cross sectional view showing a brush unit of a modified form of the brush unit shown in FIG. 3.

With the vehicle alternator of the present modification, the sealing plate member of the brush unit of the first modification is modified in structure in contrast to the shape of the sealing plate member 68A of the brush unit 60A of the first modification shown in FIG. 5.

More particularly, with the present modification, a sealing plate member 68B of a brush unit 60B includes, in addition to the first and second partition walls 85A, a third partition wall 85B that is placed between the slip rings 52, 54 and the first and second partition walls 85A in an area over the wear-particle drop-off passage 87A.

Figure 6:
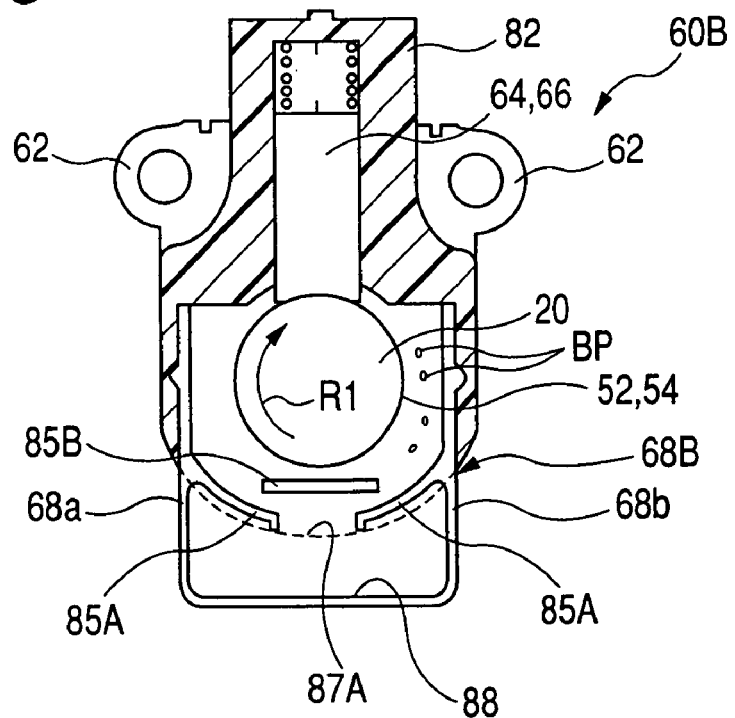
FIG. 6 is a cross sectional view showing a brush unit of another modified form of the brush unit shown in FIG. 3.

With the sealing plate member 68B of such a structure, the third partition wall 85B has a left end laterally extending to an area over a distal end portion of the first partition wall 85A and a right end laterally extending to another area over a distal end portion of the second partition wall 85A as shown in FIG. 6. Thus, the third partition wall 85B partially overlaps the distal end portions of the first and second partition walls 85A along a vertical plane with respect to the wear-particle drop-off passage 87A. This allows the wear-particle drop-off passage 87A to take a kind of labyrinth seal structure, thereby reliably preventing the brush-wear particles, accumulated in the wear-particle collecting section 88, from re-scattering.

Further, with the structure of the second modification, the first and second partition walls 85A and the third partition wall 85B are formed in symmetry with respect to the central axis of the rotary shaft 20. This allows the brush-wear particles to be reliably guided to the wear-particle collecting section 88 regardless of the rotational direction of the rotary shaft 20.

(Third Modified Form)

Figure 7:
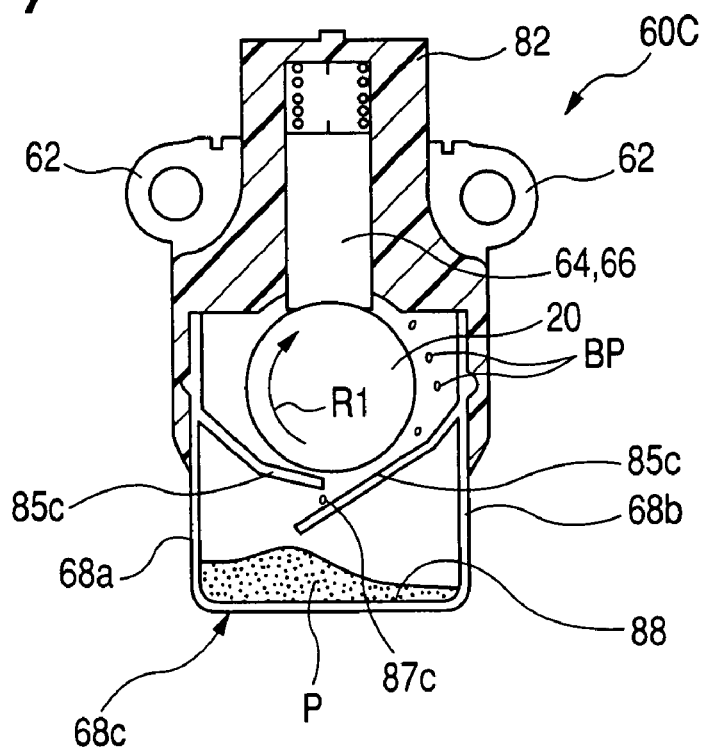
FIG. 7 is a cross sectional view showing a brush unit of another modified form of the brush unit shown in FIG. 3.

A vehicle alternator of a third modified form of the first embodiment is described below with reference to FIG. 7. The same component parts as those of the vehicle alternator of the first embodiment bear like reference numerals.

With the vehicle alternator of the present modification, a sealing plate member 68C of a brush unit 60C includes first and second partition walls 85C obliquely extending inward and downward from the sidewall portions 68a, 68b. The first partition wall 85C has the lowest right end that is placed directly below the central axis of the rotary shaft 20. The second partition wall 85C has the lowest left end that further extends downward beyond an area directly below the central axis of the rotary shaft 20 such that the left end of the second partition wall 85C is lower than the right end of the first partition wall 85C. This allows a wear-particle drop-off passage 87C to take a kind of labyrinth seal structure, thereby reliably preventing the brush-wear particles P, accumulated in the wear-particle collecting section 88, from re-scattering.

(Fourth Modified Form)

Figure 8:
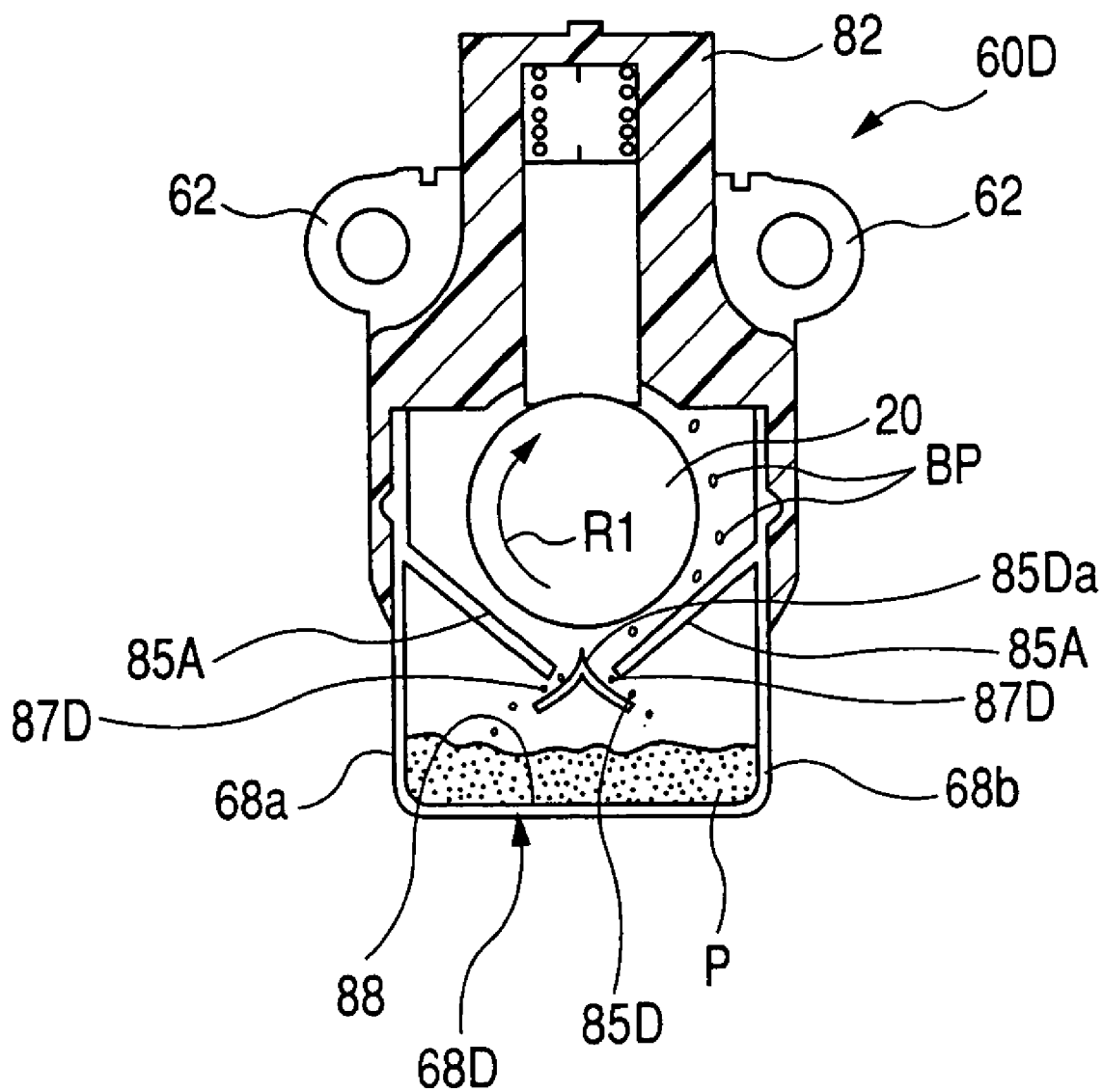
FIG. 8 is a cross sectional view showing a brush unit of still another modified form of the brush unit shown in FIG. 3.

A vehicle alternator of a fourth modified form of the first embodiment is described below with reference to FIG. 8. The fourth modified form differs from the first modification shown in FIG. 5 in respect of a sealing plate member and the same component parts as those of the of the first modification bear like reference numerals.

With the present modification, a sealing plate member 68D of a brush unit 60D includes, in addition to the first and second partition walls 85A, a third partition wall 85D is formed in a reversed "V" shape in cross section and placed below the first and second partition walls 85A in an area between the distal ends of the first and second partition walls 85A so as to form first and second split wear-particle drop-off passages 87D. A tip 85Da of the third partition wall 85D may be preferably located in an area below the distal ends of the first and second partition walls 85A or may preferably protrudes upward from the distal ends of the first and second partition walls 85A.

The third partition wall 85D has two bifurcated upper surfaces each formed in a tapered shape, enabling the brush-wear particles BP to be promoted in reliably sliding and dropping off to the wear-particle collecting section 88. In addition, the first and second partition walls 85A and the third partition wall 85D are formed in symmetry with respect to the central axis of the rotary shaft 20. This allows the brush-wear particles BP to be reliably guided to the wear-particle collecting section 88 regardless of the rotational direction of the rotary shaft 20.

A vehicle alternator of a second embodiment according to the present invention is described below with reference to FIGS. 9 and 10.

The vehicle alternator of the second embodiment differs from the vehicle alternator of the first embodiment in respect of a protector cover and a brush unit. The same component parts as those of the first embodiment bear like reference numerals with a description being made with a focus on differing features.

A protector cover 102 is fixedly secured to the rear frame 14 so as to define an electric parts compartment 104 accommodating an electric device including the rectifier 22, the voltage regulator 24 and a brush unit 106 all of which are fixedly mounted on the rear frame 14.

(Brush Device 106)

Hereunder, the brush unit 106, giving features of the present embodiment, and the protector cover 102 are described in detail with reference to FIG. 10. FIG. 10 is an enlarged fragmentary cross sectional view showing the brush unit 106 and its vicinity.

The brush unit 106 includes a brush holder 110 and a slip ring cover 112 coupled to the brush holder 110 in combination.

The brush holder 110 includes the pair of brushes 64, 66 operatively supported in the brush holder 110 above the slip rings 52, 54 at axially spaced positions in sliding contact with the slip rings 52, 54, respectively, the pair of springs 70, 72 for urging the brushes 64, 66 in pressured contact with the slip rings 52, 54, and a holder body 114 having a brush accommodating section 114a that accommodates therein the brushes 64, 66 to allow lower ends thereof to be held in pressured contact with the slip rings 52, 54.

Further, the slip ring cover 112 serves to cover and protect the slip rings 52, 54 formed on the rear end portion 20b of the rotary shaft 20. The slip ring cover 112 has a cylindrical shape that is held in mating engagement with an end face of the brush holder 110 on a side facing the rotary shaft 20.

With the vehicle alternator 100 of the present embodiment, the brush unit 106 is comprised of the brush holder 110 and the slip ring cover 112 coupled to each other in combination, thereby forming a covering member for covering the surrounding areas of the slip rings 52, 54 and the brushes 64, 66.

A sealing member 116, made of flexible material such as, for instance, rubber, is disposed between the brush holder body 110 and the slip ring cover 112, and the protector cover 102. Likewise, a sealing member 118, made of flexible material such as, for instance, rubber, is disposed between the brush holder body 110 and the slip ring cover 112, and the rear frame 14.

The sealing members 116, 118 are disposed in areas around the brush holder 110 and the slip ring cover 112, thereby providing airtightness in a surrounding space of the slip rings 52, 54 and the brushes 64, 66.

Further, the protector cover 102 includes a cover body 102a, fixedly secured to the rear frame 14 by means of bolts 36b and nuts 36c, and a cover convex portion 102b formed on the cover body 102a so as to axially protrude outward therefrom along an axis of the rotary shaft 20. The cover convex portion 102b includes a wear-particle collecting section 102c for collecting brush-wear particles BP, coming from the brushes 64, 66 in sliding contact with the slip rings 52, 54, to accumulate the brush-wear particles BP in the wear-particle collecting section 102c in a layer P of sediments. To this end, the wear-particle collecting section 102c remains in communication with a surrounding space S around the brushes 64, 66 and the slip rings 52, 54. The wear-particle collecting section 102c has a bottom wall 102d that radially protrudes downward, that is, toward the ground away from the slip rings 52, 54 with the vehicle alternator 100 installed on the vehicle. More particularly, the bottom wall 102d of the wear-particle collecting section 102c is formed in size (in shape and capacity) to have a larger capacity than that in which the brush particles P are accumulated when the brushes 64, 66 are used for their application limits.

With the vehicle alternator 100 of the present embodiment, the sealing member 116 is interposed between the slip ring cover 112 and the protector cover 102 and the sealing member 118 is interposed between the rear cover 14 and the slip ring cover 112. This allows the slip ring cover 112 and the protector cover 102 to ensure increased airtightness in the surrounding space S around the slip rings 52, 54 to reliably prevent water-incursion. In addition, the brush particles BP, disenabled to be expelled to the outside due to an increase in airtightness of the surrounding space S, are accumulated in the wear-particle collecting section 102c of the cover convex portion 102b formed on the protector cover 102. Thus, no brush particle BP adheres onto sliding surfaces of the slip rings 52, 54 and the brushes 64, 66. This makes it possible to avoid the occurrence of abnormal wears of the brushes 64, 66 and defective power generating operation of the vehicle alternator 100 caused by such abnormal wears of the brushes 64, 66.

Further, the cover convex portion 102b has the wear-particle collecting section 102c whose bottom wall 102d is placed in a lower area closer to the ground than the slip rings 52, 54 when the vehicle alternator 100 is installed on the vehicle. In particular, the wear-particle collecting section 102c is so dimensioned in shape so as to have an adequate capacity available to accommodate the brush particles caused when the brushes 64, 66 are consumed for their application limits. Therefore, the wear-particle collecting section 102c becomes possible to reliably accumulate the brush particles BP, resulting from the brushes 64, 66 during the operation of the vehicle alternator 100 for generating electric power, in the cover convex portion 102c of the protector cover 102.

While the vehicle alternator 100 of the present embodiment has been described above with reference to the protector cover 102 formed with the cover convex portion 102b, including the wear-particle collecting section 102c, which is fixed in structure with respect to the center of axis of the rotary shaft 20, the present invention is not limited to such a stationary structure. That is, the cover convex portion 102b may take the form of a structure that is rotatable in a circumferential direction.

Figure 9:
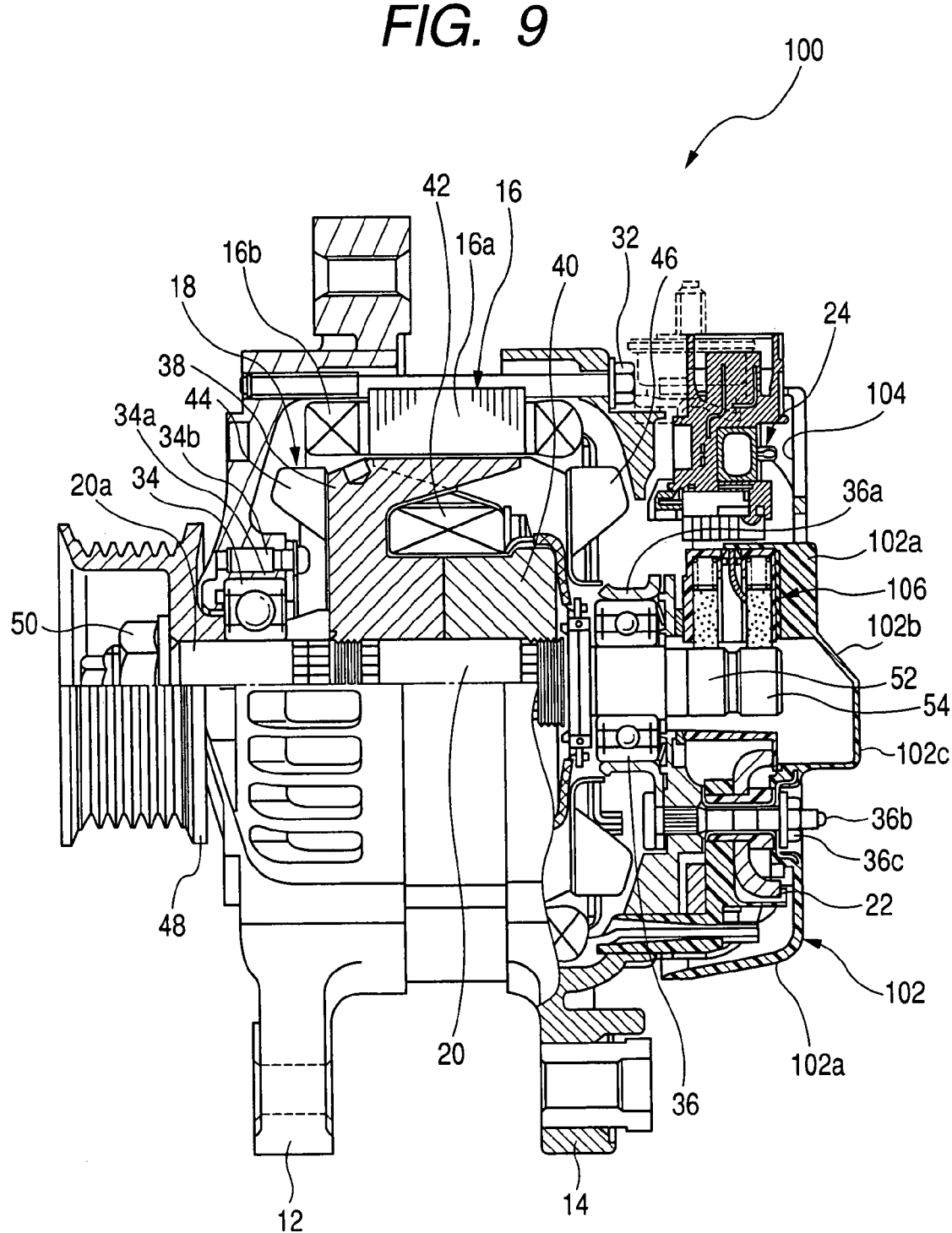
FIG. 9 is a cross sectional view showing an overall structure of a vehicle alternator of a second embodiment according to the present invention.
Figure 10:
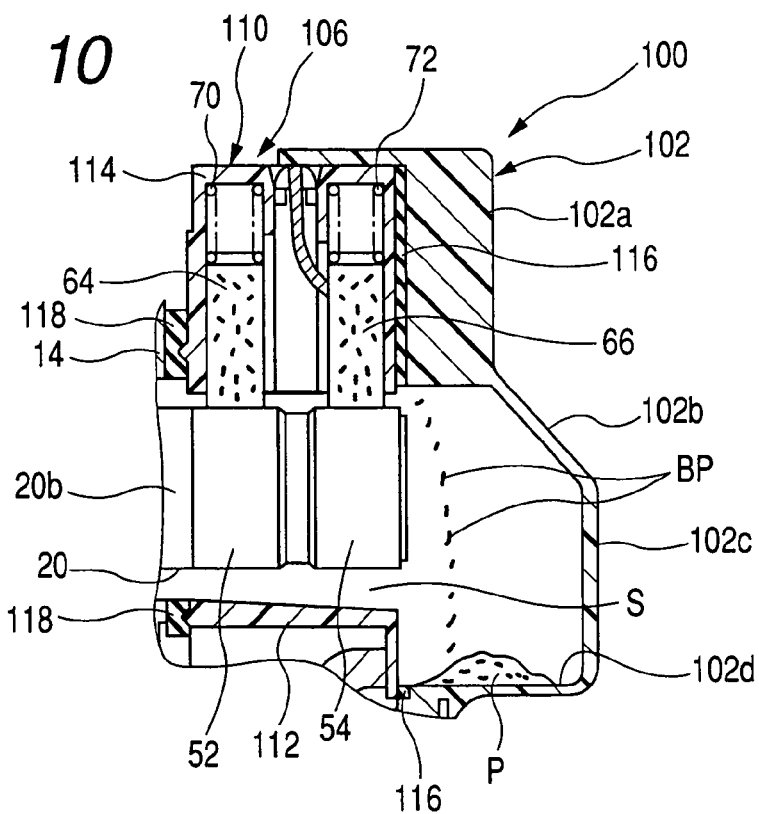
FIG. 10 is a perspective fragmentary view showing a brush unit and a protector cover forming parts of the vehicle alternator of the second embodiment shown in FIG. 9.
Figure 11:
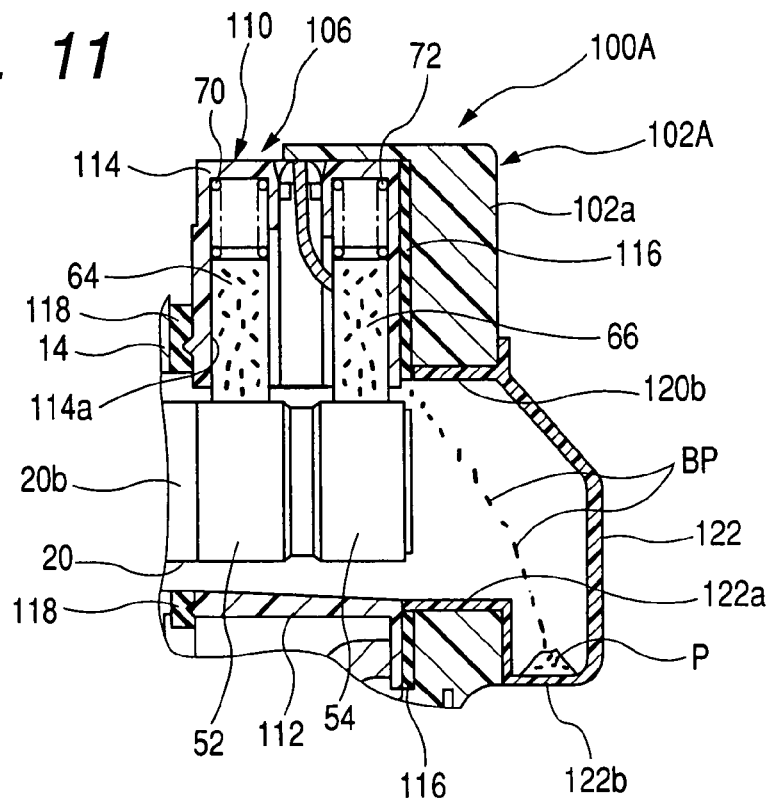
FIG. 11 is a perspective fragmentary view showing a brush unit and a protector cover of a vehicle alternator of a modified form of the second embodiment shown in FIG. 9.
Figure 12:
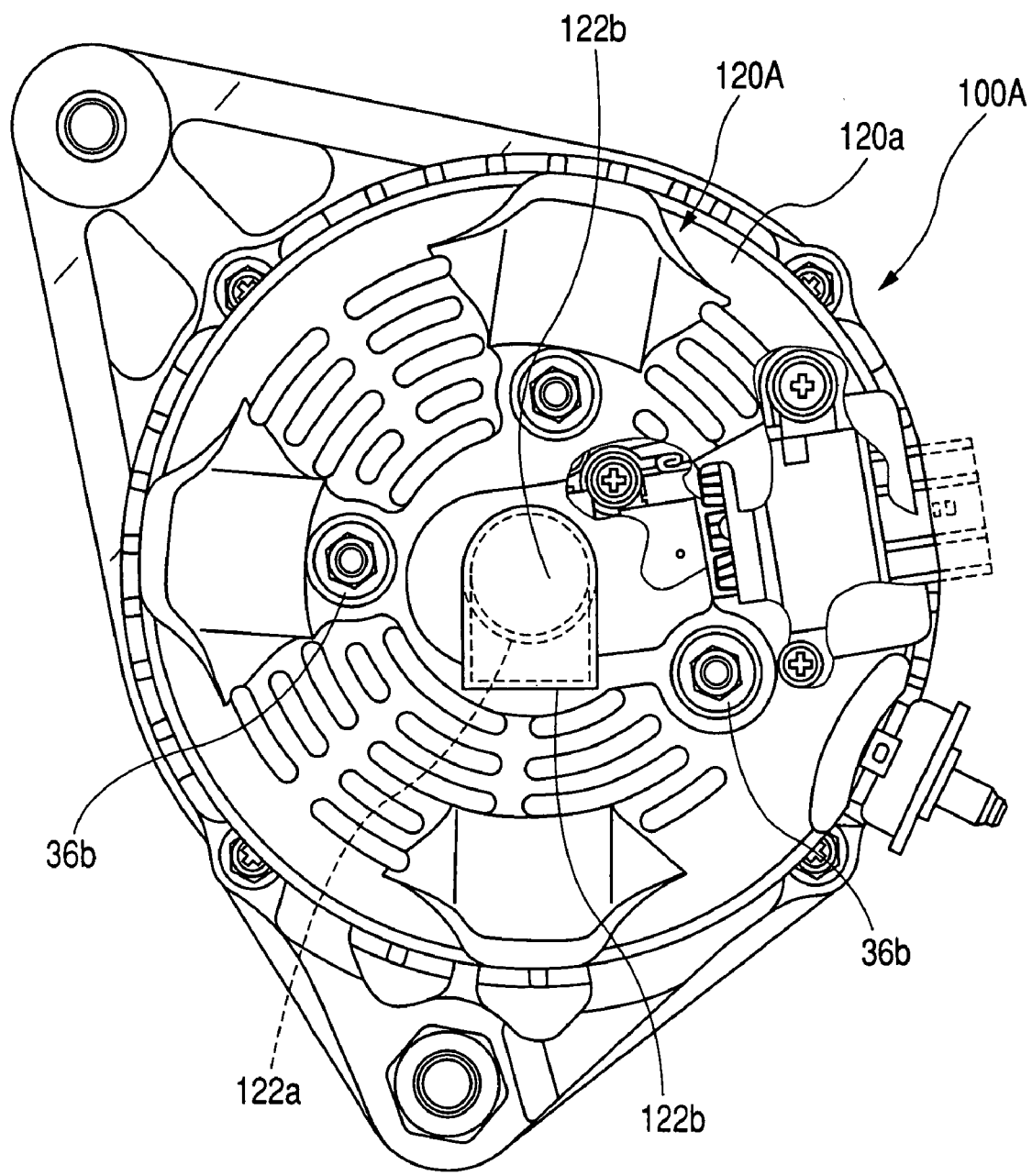
FIG. 12 is a rear view of the vehicle alternator of the modified form shown in FIG. 11.

FIG. 11 is an enlarged fragmentary cross sectional view showing a vehicle alternator 100A of a modified formed of the second embodiment shown in FIGS. 9 and 10. FIG. 12 is a rear view of the vehicle alternator 100A of the modified form shown in FIG. 11.

With the vehicle alternator 100A shown in FIGS. 11 and 12, a protector cover 120 includes a cover body 120a, formed with an axially extending bore 120b, and a cover convex member 122 serving as a wear-particle collecting cover. The wear-particle collecting cover 122 has a front end formed with an axially extending cylindrical hollow tube 120a that is rotatably disposed through the axially extending bore 120b of the cover body 120a of the protecting cover 120. The wear-particle collecting cover 122 has a bottom wall 122b that has an internal space expanded in a rectangular shape extending in a radial direction. This allows the wear-particle collecting cover 122 to be rotated such that the bottom wall 122b is brought into alignment with a direction facing the ground with the vehicle alternator being assembled to the vehicle.

With the vehicle alternator 100A employing the protecting cover 120 provided with such a rotatable wear-particle collecting cover 122, even if the vehicle alternator 100A is assembled to the vehicle in an improper position deviated from a correct position, the cover convex member 122 of the protecting cover 120 can be tilted at an adjusted position. Thus, the brush particles BP can be accumulated on the bottom wall 122b of the wear-particle collecting cover 122 at the highest accumulating efficiency. Therefore, no need arises for discrete protector covers 120, which have cover convex portions oriented at differing angles each for an assembled state of the vehicle alternator, to be prepared. This results in a capability of suppressing an increase in production cost of the vehicle alternator due to an increase in the number of component parts.

Further, while the vehicle alternator of the second embodiment has been described above with reference to the structure including the brush holder 110 and the slip ring cover 112 in combination, the present invention is not limited to such a particular structure. That is, the present invention may be implemented such that the vehicle alternator of the second embodiment may take the form of another structure provided that such another structure can ensure airtightness in the surrounding space S around the brushes 64, 66 and the slip rings 52, 54. For instance, the rear frame 14 may have an axial end face integrally formed with a tubular member that is used in place of the slip ring cover 112. However, with sun an alternative structure, a need arises to additionally provide a separate sealing member in order to ensure airtightness between the tubular member and the brush holder 110.

Furthermore, while the vehicle alternator of the second embodiment has been described above with reference to the structure wherein the protecting covers 102, 120 include the cover convex portions 102b, 122 that radially protrude downward, the present invention is not limited to such a particular structure. That is, the cover convex portion may be formed in a circular shape while increasing a diameter of the cover convex portion. By so doing, the cover convex portion can ensure an internal space available to adequately accumulate the brush particles in the cover convex portion regardless of a state under which the vehicle alternator is mounted on the vehicle.

A vehicle alternator of a third embodiment according to the present invention is described below with reference to FIGS. 13 to 18.

Figure 13:
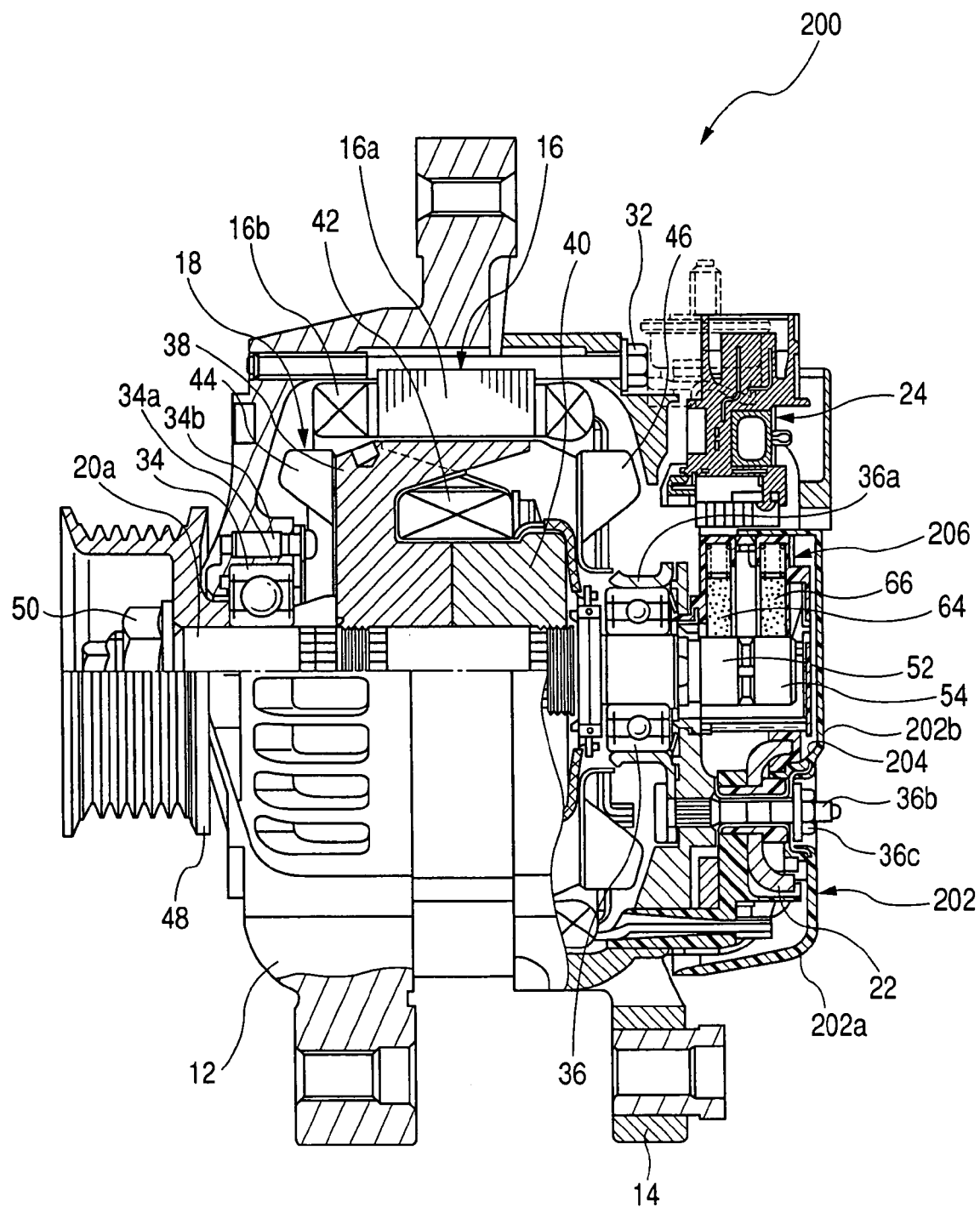
FIG. 13 is a cross sectional view showing an overall structure of a vehicle alternator of a third embodiment according to the present invention.
Figure 14:
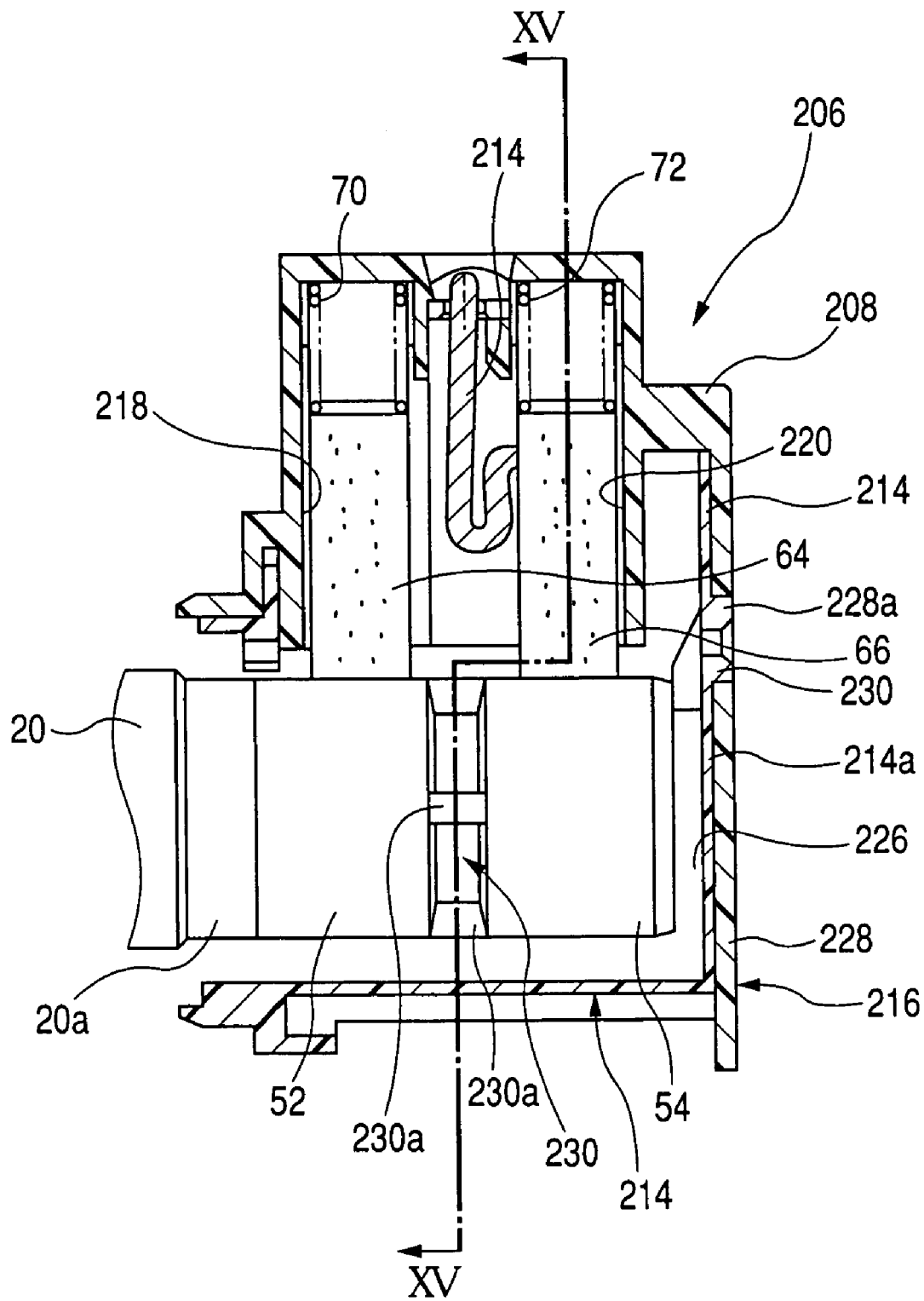
FIG. 14 is a perspective fragmentary view showing a brush unit and a protector cover forming parts of the vehicle alternator of the third embodiment shown in FIG. 13.
Figure 15:
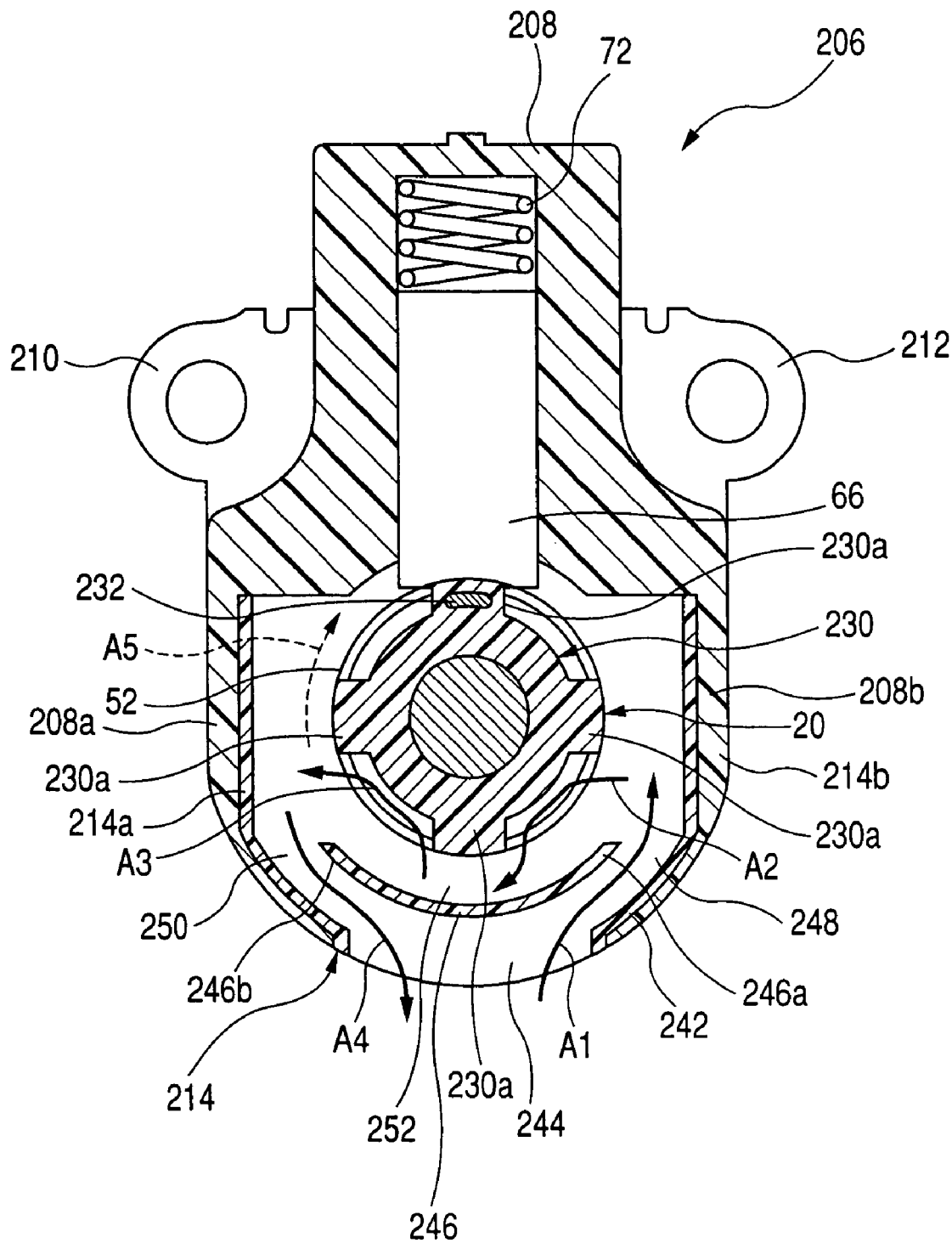
FIG. 15 is a cross sectional view taken on line XI-XI of FIG. 14.
Figure 16:
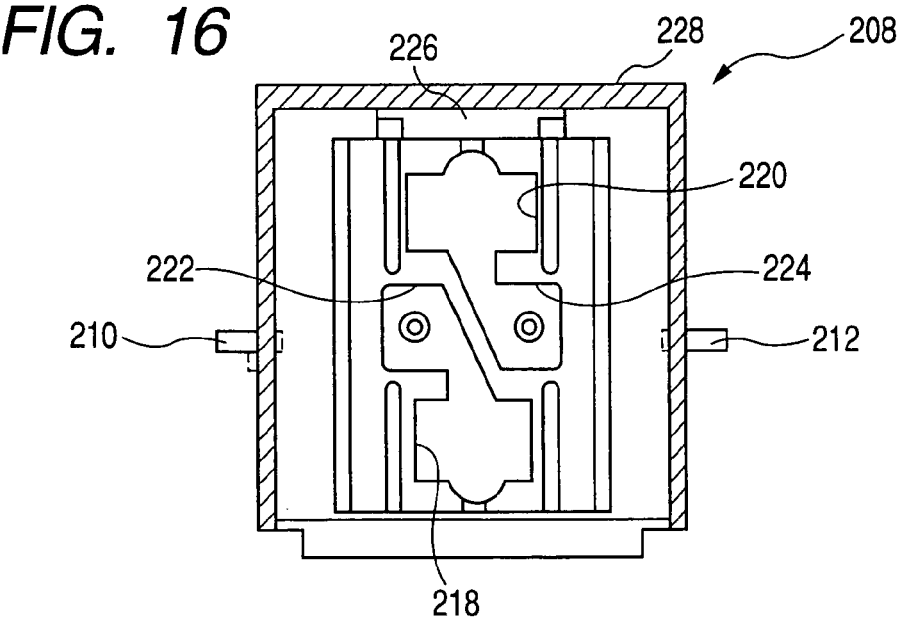
FIG. 16 is a plan view of a brush holder forming part of a brush unit shown in FIG. 15.
Figure 17:
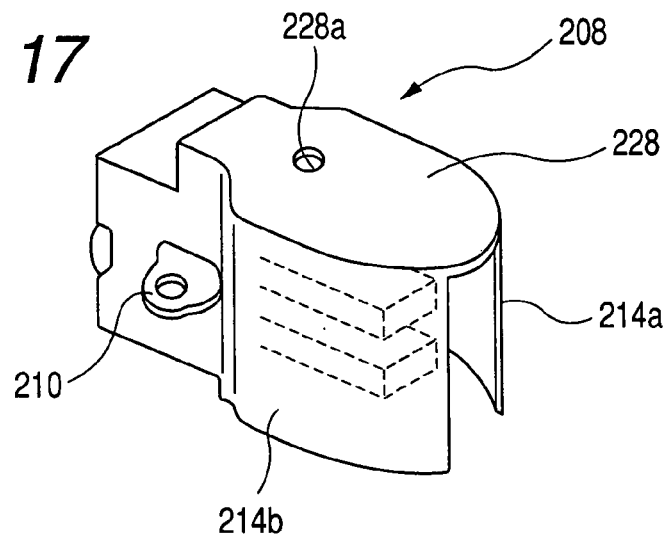
FIG. 17 is a perspective view showing the brush holder shown in FIG. 16.
Figure 18:
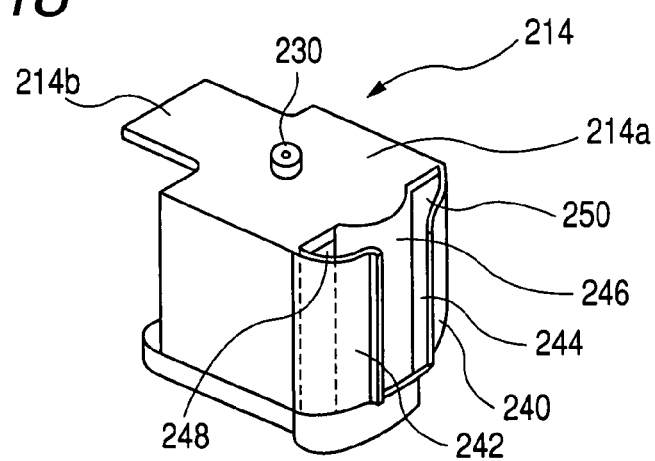
FIG. 18 is a perspective view showing a slip ring cover associated with the brush holder in combination.

FIG. 13 is an overall structure of the vehicle alternator 200 of the present embodiment. FIG. 14 is an enlarged fragmentary cross sectional view showing a brush unit and the rotary shaft. FIG. 15 is an enlarged cross sectional view taken on line XV-XV of FIG. 14. FIG. 16 is a plan view of a brush holder, as viewed in a radial direction, and shows the brush holder in a state before brushes are accommodated. FIG. 17 is a perspective view showing the brush holder. FIG. 18 is a perspective view showing a slip ring cover to be combined with the brush holder.

The vehicle alternator 200 of the third embodiment differs from the vehicle alternator of the first embodiment in respect of a brush-particle discharging device. The same component parts as those of the first embodiment bear like reference numerals with a description being made with a focus on differing features.

A protector cover 202 is fixedly secured to the rear frame 14 so as to define an electric parts compartment 204 accommodating an electric device including the rectifier 22, the voltage regulator 24 and a brush unit 206 all of which are fixedly mounted on the rear frame 14.

The brush unit 206 includes a brush holder 60, made of resin, which has connection terminals 210, 212, a pair of brushes 64, 66 held in sliding contact with the slip rings 52, 54, pig tails 214 serving as brush copper wires, respectively, through which the brushes 64, 66 and the connection terminals 210, 212 are electrically connected, a slip ring cover 214 made of resin, and springs 70, 72.

With such a structure, the brush holder 60 and the slip ring cover 214 form an enclosure member 216 that encloses the brushes 64, 66 and the slip rings 52, 54.

The brush holder 60 takes the form of a substantially box-like configuration in cross section and has brush accommodating portions 218, 220 facing the slip ring cover 214, pig tail receiving portions 222, 224 for receiving therein the pig tails 214, respectively, and a radiated recess 80 for insertion of an extension 214b of a lid cover 214a of the slip ring cover 214. In addition, the brush holder 60 has a cover portion 228 that closes an axial end portion placed in face-to-face relation to a rear end face of the rotary shaft 14 (in opposition to the pulley 48).

The lid cover 214a, formed on the slip ring cover 214 at the axial end thereof, has a protrusion 230 axially extending outward. The cover portion 228, adapted to cover the axial end of the brush holder 60, has a coupling bore 228a. The protrusion 230 of the lid cover 214a is fitted to the coupling bore 228a of the cover portion 228. This allows the brush holder 60 and the slip ring cover 214 to be coupled to each other. The protrusion 230 of the lid cover 214a and the coupling bore 228a of the cover portion 228 constitute an engaging portion. The use of such an engaging portion makes it easy to assemble the brush holder 60 and the slip ring cover 214 to each other and hold these component elements in a fixed place, resulting in an increase in workability and airtightness.

The brushes 64, 66 are inserted to the brush accommodating portions 218, 220, formed in the brush holder 206, and held in pressured sliding contact with the slip rings 52, 52, formed on the rotary shaft 20, by the actions of the springs 70, 72. Under such a state, the rectifier 22 supplies an excitation current to the field winding 42 via the brushes 64, 66 and the slip rings 52, 54, during which the rotary shaft 20 is rotatably driven with the pulley 48 in response to drive torque delivered from the engine. Thus, the vehicle alternator 200 generates electric power.

As shown in FIGS. 14 and 15, the rear end portion 20a of the rotary shaft 20 carries thereon an insulating member 230 in an area between the pair of slip rings 52, 54.

The insulating member 230 is smaller in diameter than the slip rings 52, 54 and a plurality of radial protrusions 230a formed at equidistantly spaced positions on the rear end portion 20a of the rotary shaft 20 in a circumferential direction thereof and axially extending, respectively.

With the vehicle alternator 200 of the present embodiment, the rotary shaft 20 has four radial protrusions 230a formed on the rear end portion 20a of the rotary shaft 20 at the equidistantly spaced positions at an angle of 90°. One of the radial protrusions 230a incorporates therein an axially extending connection bar 232, serving as a wiring member, for electrically connecting the slip ring 54 to one terminal of the field winding 42.

Further, with the structure shown in FIG. 15, although the insulating member 230 has been shown with reference to a case wherein a whole of the connection bar 232 is buried in the radial protrusion 230a of the insulating member 230, the connection bar 232 may have an outer circumferential periphery a part of which is incorporated in the radial protrusion 230a.

Further, the slip ring cover 214 has first and second sidewalls 214a, 214b vertically extending at positions radially spaced the outer periphery of the rear end portion 20a of the rotary shaft 20. The first and second sidewalls 214a, 214b have outer walls in tight contact with inner walls of vertically extending bifurcated sidewalls 208a, 208b of the brush holder 60. In addition, the first and second sidewalls 214a, 214b have downwardly extending curved slopes 240, 242, which are ended with an opening portion 244. The opening portion 244 is located in an area below the slip rings 52, 54 with the vehicle alternator 200 being assembled to the vehicle.

Furthermore, the slip ring cover 214 carries thereon a partition wall 246 that axially extends in an area between the opening portion 244 of the slip ring cover 214 and the outer peripheries of the slip rings 52, 54. The partition wall 246 has an inner periphery concentric to the outer peripheries of the slip rings 52, 54. The partition wall 246 has a right distal end 246a radially spaced from the curved slope 242 of the slip ring cover 214 to define an air-intake opening 248. Likewise, the partition wall 246 has a left distal end 246b radially spaced from the curved slope 240 of the slip ring cover 214 to define an exhaust opening 250. The air-intake opening 248 and the exhaust opening 250 are dimensioned so as to have the same cross sectional surface area.

In FIG. 15, arrows A1 to A4 designate flows of air streams created when the radial protrusions 230a rotates with the rotation of the rotary shaft 20. In addition, an arrow A5, shown in a dotted line in FIG. 15, designates a direction in which the rotary shaft 20 rotates. As the radial protrusions 230a rotate with the rotation of the rotary shaft 20, flows of air streams occur in a path along the rotational direction of the rotary shaft 20. Therefore, the air stream, admitted through the opening portion 244, passes through an circular arc-shaped passage 252 defined between the partition wall 246 and the outer peripheries of the slip rings 52, 54 as shown by the arrows A2, A3 and guided to the exhaust opening 250. Thereafter, the air stream is discharged from the slip ring cover 214 to the outside thereof.

With the vehicle alternator 200 of the present embodiment, thus, the radial protrusions 230a of the insulating member 230, provided on the rear end portion 20a of the rotary shaft 20, rotate with the rotation of the output shaft 20. This enables an increase in the flow rate of air wind passing through areas around the slip rings 52, 54. Accordingly, the brushes 64, 66 can have increased cooling performances. Especially, with the insulating member 230 having the radial protrusions 230a extending in the axial direction of the rotary shaft 20, the rotation of the rotary shaft 20 enables air, staying in the area around the rear end portion 20a of the rotary shaft 20, to flow in the rotational direction thereof at high efficiency. This suppresses the temperature rises of the brushes 64, 66 due to a lack of cooling performances, making it possible to avoid any trouble that may arise in abnormal wears of the brushes 64, 66 and a shortage between the slip rings 52, 54 with a resultant halt in operation to generate electric power.

Moreover, with the insulating member 230 including the plurality of radial protrusions 230a formed on the rear end portion 20a of the rotary shaft at equidistantly spaced positions, the air streams can be created to flow through an area around the rear end portion 20a of the rotary shaft 20 at increased efficiency.

In addition, by utilizing an inner part of one of the radial protrusions 230a to incorporate the connection bar 232 for electrically connecting the slip ring 54, remotest from the field winding 42, and the field winding 42 to each other, the connection bar 232 has an increased freedom in layout.

Further, with the vehicle alternator 200 installed on the vehicle, the slip ring cover has the opening portion 244 located below the slip rings 52, 54. This makes it easy for the air streams to be guided from the outside to the areas close proximity to the sliding surfaces between the slip rings 52, 54 and the brushes 64, 66 and the radial protrusions 230a of the insulating member 230. In addition, the brush-wear particles, caused in the sliding surfaces, can be discharged through the opening portion 244 at high efficiency.

Furthermore, with the slip ring cover 214 having the partition wall 246 extending between the opening portion 244 and the pair of slip rings 52, 54, the air stream can be guided to the circular arc-shaped passage 252, formed between the outer peripheries of the slip rings 52, 54 and the partition wall 246, in a path extending along the rotational direction of the radial protrusion 230a. This allows the air stream to flow from an upstream area to a downstream area, making it possible to provide increased cooling performances while enabling the discharging of the brush-wear particles at high efficiency.

Moreover, the partition wall 246 has the circular arc-shaped inner periphery concentric to the slip rings 52, 54 and the right distal end 246a of the partition wall 246 and the curved slope 242 of the slip ring cover 214 defines the air-intake opening 248 in the upstream area while the left distal end and the curved slope 240 of the slip ring cover 214 defines the exhaust opening 250 in the downstream area, with the air-intake opening 248 and the exhaust opening 250 having the same cross sectional surface area. This eliminates a localized increase in ventilation resistance of the air stream.

While the vehicle alternator 200 of the present embodiment has been described with reference to an exemplary structure having the insulating member 214 provided with the plurality of radial protrusions 230a located between the slip rings 52, 54, the present invention is not limited to such a structure. That is, the insulating member 230 may further include additional radial protrusions formed in at least one of an area adjacent to the slip ring 52 on a side closer to the pulley 48 or another area adjacent to the slip ring 54 on a side remotest from the pulley 48.

Further, while the vehicle alternator 200 of the present embodiment has been described with reference to an exemplary structure wherein the insulating member 214 has the plurality of radial protrusions 230a extending along the axial direction of the rotary shaft 20, the radial protrusions 230a may be formed so as to extend at sloped angles with respect to the axis of the rotary shaft 20.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. An alternator for a vehicle, comprising:
a frame supporting a stator having a stator winding;
a rotary shaft rotatably supported with the frame and having slip rings;
a rotor fixedly carried on the rotary shaft to be rotatable inside the stator and having a field winding electrically connected to the slip rings;
a brush unit fixed to the frame and having a brush holder, formed with brush accommodating portions for holding brushes in areas above the slip rings in sliding contact therewith, respectively, a slip ring accommodating section for covering outer peripheries of the slip rings, springs for pressing the brushes toward the slip rings, respectively, and a sealing plate member coupled to the brush holder for covering the outer peripheries of the slip rings, the brush unit having one end face formed with an opening portion, axially opening toward the frame and surrounding the rotary shaft, which is spaced from the frame with a clearance that is substantially sealed, and the other end face closed with the brush holder and the sealing plate member; and
a brush-wear particle collecting member placed in close proximity to at least one of the slip rings in an area below the slip rings and associated with the brush holder for collecting brush-wear particles generated by the brushes in sliding contact with the slip rings,
wherein the brush-wear particle collecting member includes a brush-wear particle collecting section, formed on the sealing plate member in the area below the slip rings, which has a narrowed wear-particle drop-off passage through which the brush-wear particles are guided to the brush-wear particle collecting section.

2. The alternator for a vehicle according to claim 1, wherein:
the sealing plate member includes a partition wall laterally extending along an axial direction of the rotary shaft in an area between the outer peripheries of the slip rings and the brush-wear particle collecting section; and
the partition wall having a distal end defining a narrowed wear-particle drop-off passage with respect to an inner wall of the sealing plate member.

3. The alternator for a vehicle according to claim 2, wherein: the partition wall is made of resin to be integrally formed with the sealing plate member.

4. The alternator for a vehicle according to claim 2, wherein:
the partition wall laterally extends from an inner wall of the sealing plate member in a direction opposite to a direction in which the slip rings rotate.

5. The alternator for a vehicle according to claim 2, wherein: the brush-wear particle collecting member has one region beneath the partition wall and the other region beneath the wear-particle drop-off passage, with the one region having a greater capacity than that of the other region.

6. The alternator for a vehicle according to claim 1, wherein:
the sealing plate member includes first and second sloped partition walls laterally extending downward toward the narrowed wear-particle passage from inner walls of the sealing plate member along an axial direction of the rotary shaft in areas between the outer peripheries of the slip rings and the brush-wear particle collecting section; and
the first and second partition walls having distal ends defining therebetween the narrowed wear-particle drop-off passage.

7. The alternator for a vehicle according to claim 6, wherein:
the sealing plate member further includes a third partition wall, placed between a clearance between the first and second partition walls and the slip rings, which axially extends from an inner wall, placed in opposition to the frame, of the sealing plate member toward the frame at a height different from those of the first and second partition walls so as to vertically overlap the first and second partition walls in a spaced relationship thereto.

8. The alternator for a vehicle according to claim 1, wherein:
the sealing plate member includes first and second sloped partition walls laterally extending downward at different heights toward the narrowed wear-particle passage from inner walls of the sealing plate member along an axial direction of the rotary shaft in intervening areas between the outer peripheries of the slip rings and the brush-wear particle collecting member; and
the first and second partition walls having distal ends vertically overlapping each other through a clearance defining the narrowed wear-particle drop-off passage.

9. The alternator for a vehicle according to claim 1, wherein:
the partition wall has a distal end formed with a downwardly extending protrusion forming the narrowed wear-particle drop-off passage.

10. The alternator for a vehicle according to claim 1, wherein:
the partition wall continuously slopes downward toward a distal end thereof.

11. The alternator for a vehicle according to claim 1, wherein:
the sealing plate member has first and second sidewalls fitted to the brush holder; and
wherein the partition wall laterally extends from the first sidewall, and the sealing plate member has a slanted wear-particle slipping slope obliquely extending downward from the second sidewall in an area below the narrowed wear-particle drop-off passage.

12. The alternator for a vehicle according to claim 1, wherein:
the brush-wear particle collecting member has a capacity available to accumulate a total amount of brush-wear particles supposed to appear during a given usable life of the vehicle.

13. An alternator for a vehicle, comprising:
a frame supporting a stator having a stator winding;
a rotary shaft rotatably supported with the frame and having slip rings;
a rotor fixedly carried on the rotary shaft to be rotatable inside the stator and having a field winding electrically connected to the slip rings;
a brush unit fixed to the frame and having a brush holder, formed with brush accommodating portions for holding brushes in areas above the slip rings in sliding contact therewith, respectively, a slip ring accommodating section for covering outer peripheries of the slip rings, springs for pressing the brushes toward the slip rings, respectively, and a sealing plate member coupled to the brush holder for covering the outer peripheries of the slip rings, the brush unit having one end face formed with an opening portion, axially opening toward the frame and surrounding the rotary shaft, which is spaced from the frame with a clearance that is substantially sealed, and the other end face closed with the brush holder and the sealing plate member; and a brush-wear particle collecting member placed in close proximity to at least one of the slip rings in an area below the slip rings and associated with the brush holder for collecting brush-wear particles generated by the brushes in sliding contact with the slip rings, wherein the brush unit further includes a protector cover fixedly secured to the brush holder;

a sealing member interposed between the protector cover and the brush holder for ensuring airtightness of the surrounding space; and the protector cover includes a cover convex portion facing the brush device and serving as the brush-wear particle collecting member.

14. The alternator for a vehicle according to claim 13, wherein:
the brush-wear particle collecting member is formed in communication with the surrounding space and has at least one portion located in an area closer to the ground than the slip rings under a state where the alternator is assembled to the vehicle.

15. The alternator for a vehicle according to claim 13, wherein:
the at least one portion of the brush-wear particle collecting member has a capacity available to accumulate a total amount of brush-wear particles generated for a period of time in which the brushes are used for related application limits.

16. The alternator for a vehicle according to claim 13, wherein:
the brush-wear particle collecting member is supported on the protector cover to be rotatable about a center of axis of the rotary shaft.

17. An alternator for a vehicle, comprising:
a frame supporting a stator having a stator winding;
a rotary shaft rotatably supported with the frame and having slip rings;
a rotor fixedly carried on the rotary shaft to be rotatable inside the stator and having a field winding electrically connected to the slip rings;
a brush unit fixed to the frame and having a brush holder, formed with brush accommodating portions for holding brushes in areas above the slip rings in sliding contact therewith, respectively, a slip ring accommodating section for covering outer peripheries of the slip rings, springs for pressing the brushes toward the slip rings, respectively, and a sealing plate member coupled to the brush holder for covering the outer peripheries of the slip rings, the brush unit having one end face formed with an opening portion, axially opening toward the frame and surrounding the rotary shaft, which is spaced from the frame with a clearance that is substantially sealed, and the other end face closed with the brush holder and the sealing plate member;
a brush-wear particle collecting member placed in close proximity to at least one of the slip rings in an area below the slip rings and associated with the brush holder for collecting brush-wear particles generated by the brushes in sliding contact with the slip rings;
a protector cover fixed to the brush holder for covering the brushes in sliding contact with the slip rings, and surrounding spaces around the brushes and the slip rings; and
brush-cooling means mounted on the rotary shaft in an area between the slip rings for cooling the brushes, wherein the brush-cooling means includes a plurality of radial protrusions formed at equidistantly spaced intervals in a circumferential direction of the rotary shaft.

18. The alternator for a vehicle according to claim 17, wherein:
at least one of the radial protrusions incorporates therein at least a portion of a wiring member providing electrical connection between the field winding and one of the slip rings remotest from the field winding.

19. The alternator for a vehicle according to claim 17, wherein:
the cover member has an opening portion opening at an area below the slip rings under a state where the alternator is assembled to the vehicle.

20. The alternator for a vehicle according to claim 19, further comprising:
a partition wall disposed between the opening portion and the slip rings.

21. The alternator for a vehicle according to claim 20, wherein:
the partition wall has an inner periphery concentric to the slip rings.

22. The alternator for a vehicle according to claim 21, wherein:
an upstream side of the partition wall has an air-intake opening defined between the partition wall and the cover member and a downstream side of the partition wall has an exhaust opening defined between the partition wall and the cover member; and
the air-intake opening and the exhaust opening have the same cross sectional surface area.

23. An alternator for a vehicle, comprising:
front and rear frames supporting a stator having a stator winding;
a rotary shaft rotatably supported with the front and rear frames and having one end portion formed with slip rings;
a rotor fixedly carried on the rotary shaft to be rotatable inside the stator andhaving a field winding electrically connected to the slip rings; and
a brush unit having a brush holder, formed with brush accommodating portions for holding brushes in sliding contact with the slip rings, respectively, a slip ring accommodating section for covering outer peripheries of the slip rings, springs for pressing the brushes toward the slip rings, respectively, and a sealing plate member coupled to the brush holder for covering the outer peripheries of the slip rings,
wherein the brush unit has a front end face, surrounding the slip rings and formed with an opening portion opened to the rear frame, and a sealing element substantially sealing a clearance between the rear frame and the front end face of the brush unit; and
the sealing plate member includes a brush-wear particle collecting section placed in close proximity to the slip rings in an area below the slip rings and having a wear-particle drop-off passage for collecting brush-wear particles generated from the brushes in sliding contact with the slip rings, and a narrowed section for narrowing the wear-particle drop-off passage along an axial direction of the rotary shaft,
wherein the sealing plate member includes a partition wall laterally extending along an axial direction of the rotary shaft in an area between the outer peripheries of the slip rings and the brush-wear particle collection section; and the partition wall having a distal end defining a narrowed wear-particle drop-off passage with respect to an inner wall of the sealing plate member.

24. The alternator for a vehicle according to claim 23, wherein:
the partition wall is made of resin to be integrally formed with the sealing plate member.

25. The alternator for a vehicle according to claim 23, wherein:
the partition wall laterally extends from an inner wall of the sealing plate member in a direction opposite to a direction in which the slip rings rotate.

26. The alternator for a vehicle according to claim 23, wherein:
the brush-wear particle collecting section has one region beneath the partition wall and the other region beneath the wear-particle drop-off passage, with the one region having a greater capacity than that of the other region.

27. The alternator for a vehicle according to claim 23, wherein:
the sealing plate member includes first and second sloped partition walls laterally extending downward toward the narrowed wear-particle passage from inner walls of the sealing plate member along an axial direction of the rotary shaft in areas between the outer peripheries of the slip rings and the brush-wear particle collecting member; and
the first and second partition walls having distal ends narrowing the wear-particle drop-off passage.

28. The alternator for a vehicle according to claim 27, wherein:
the sealing plate member further includes a third partition wall, placed between a clearance between the first and second partition walls and the slip rings, which axially extends from an inner wall, placed in opposition to the rear frame, of the sealing plate member toward the rear frame at a height different from those of the first and second partition walls so as to vertically overlap the first and second partition walls in a spaced relationship thereto.

29. The alternator for a vehicle according to claim 23, wherein:
the sealing plate member includes first and second sloped partition walls laterally extending downward toward the narrowed wear-particle passage from inner walls of the sealing plate member along the substantially axial direction of the rotary shaft in intervening areas between the outer peripheries of the slip rings and the brush-wear particle collecting member; and
the first and second partition walls having distal ends vertically overlapping with each other in a spaced relation to define therebetween the wear-particle drop-off passage.

30. The alternator for a vehicle according to claim 23, wherein:
the partition wall has a distal end formed with a downwardly extending protrusion for defining the wear-particle drop-off passage.

31. The alternator for a vehicle according to claim 23, wherein:
the partition wall continuously slopes downward toward a distal end thereof.

32. The alternator for a vehicle according to claim 23, wherein:
the sealing plate member has first and second sidewalls fitted to the brush holder; and
the partition wall laterally extends from the first sidewall, and the sealing plate member has a slanted wear-particle slipping slope obliquely extending downward from the second sidewall in an area below the narrowed wear-particle drop-off passage.

33. The alternator for a vehicle according to claim 23, wherein:
the brush-wear particle collecting section has a capacity available to collect a total amount of brush-wear particles of the brushes generated during a given usable life of the vehicle.

34. An alternator for a vehicle, comprising:
a frame supporting a stator having a stator winding;
a rotary shaft rotatably supported with the frame and having slip rings;
a rotor fixedly carried on the rotary shaft to be rotatable inside the stator and having a field winding electrically connected to the slip rings;
brushes held in sliding contact with outer peripheries of the slip rings, respectively;
a cover member covering a surrounding space around the outer peripheries of the slip rings and the brushes;
a protector cover fixedly secured to the frame for covering an electric component, involving the brushes, and including a brush-wear particle collecting section for collecting brush-wear particles resulting from sliding contact between the brushes and the slip rings; and
a sealing member disposed between the cover member and the protector cover for ensuring airtightness of the surrounding space,
wherein the brush-wear particle collecting section is formed in communication with the surrounding space; and
the at least one portion of the brush-wear particle collecting section has a capacity available to collect a total amount of brush-wear particles generated for a period of time in which the brushes are used for related application limits.

35. The alternator for a vehicle according to claim 34, wherein:
the brush-wear particle collecting section is supported on the protector cover.

36. An alternator for a vehicle, comprising:
a frame supporting a stator having a stator winding;
a rotary shaft rotatably supported with the front and rear frames and having a pair of slip rings;
a rotor fixedly carried on the rotary shaft to be rotatable inside the stator and having a field winding electrically connected to the slip rings;
a pair of brushes held in sliding contact with outer peripheries of the slip rings, respectively;
a cover member covering a surrounding space around the brushes and the outer peripheries of the slip rings; and
brush-cooling means carried on the rotary shaft in an area adjacent to the slip rings for causing an air stream to flow in the surrounding space to cool the brushes in sliding contact with the slip rings,
wherein the brush-cooling means includes a plurality of insulating radial protrusions formed within the slip rings at equidistantly spaced intervals in a circumferential direction of the rotary shaft; and
at least one of the radial protrusions incorporates therein at least a portion of a wiring member providing electrical connection between the field winding and one of the slip rings remotest from the field winding.

37. The alternator for a vehicle according to claim 36, wherein:

the cover member has an opening portion opening at an area below the slip rings under a state where the alternator is assembled to the vehicle.

38. The alternator for a vehicle according to claim 36, further comprising:

a partition wall disposed between the opening portion and the slip rings.

39. The alternator for a vehicle according to claim 38, wherein:

the partition wall has an inner periphery concentric to the slip rings.

40. The alternator for a vehicle according to claim 39, wherein:

an upstream side of the partition wall has an air-intake opening defined between the partition wall and the cover member and a downstream side of the partition wall has an exhaust opening defined between the partition wall and the cover member; and the air-intake opening and the exhaust opening have the same cross sectional surface area.

* * * * *